United States Patent
Agiwal et al.

(10) Patent No.: US 10,154,402 B2
(45) Date of Patent: Dec. 11, 2018

(54) METHOD AND APPARATUS FOR TRANSMITTING AND RECEIVING DISCOVERY INFORMATION IN WIRELESS COMMUNICATION SYSTEM, AND PROTOCOL STACK ARCHITECTURE FOR THE SAME

(71) Applicant: Samsung Electronics Co., Ltd., Suwon-si, Gyeonggi-do (KR)

(72) Inventors: Anil Agiwal, Bangalore (IN); Young-Bin Chang, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 91 days.

(21) Appl. No.: 14/904,273

(22) PCT Filed: Jul. 10, 2014

(86) PCT No.: PCT/KR2014/006194
§ 371 (c)(1),
(2) Date: Jan. 11, 2016

(87) PCT Pub. No.: WO2015/005693
PCT Pub. Date: Jan. 15, 2015

(65) Prior Publication Data
US 2016/0157080 A1    Jun. 2, 2016

(30) Foreign Application Priority Data

Jul. 10, 2013 (IN) .............................. 817/KOL/2013

(51) Int. Cl.
*H04W 8/00* (2009.01)
*H04W 4/70* (2018.01)
*H04W 4/08* (2009.01)

(52) U.S. Cl.
CPC ............. *H04W 8/005* (2013.01); *H04W 4/08* (2013.01); *H04W 4/70* (2018.02)

(58) Field of Classification Search
None
See application file for complete search history.

(56) References Cited

U.S. PATENT DOCUMENTS

| 2006/0133414 A1* | 6/2006 | Luoma ................. H04W 88/16 370/466 |
| 2007/0183367 A1* | 8/2007 | Park .................... H04L 61/2015 370/331 |

(Continued)

FOREIGN PATENT DOCUMENTS

| CN | 101346935 A | 1/2009 |
| CN | 101371466 A | 2/2009 |
| CN | 102047702 A | 5/2011 |

OTHER PUBLICATIONS

Chinese Office Action dated May 4, 2018, issued in the Chinese Application No. 201480049896.0.

*Primary Examiner* — Brian S Roberts
(74) *Attorney, Agent, or Firm* — Jefferson IP Law, LLP

(57) ABSTRACT

The present disclosure relates to a pre-5$^{th}$-Generation (5G) or 5G communication system to be provided for supporting higher data rates beyond 4$^{th}$-generation (4G) communication system such as long term evolution (LTE). A method and user equipment (UE) for transmitting and receiving discovery information in a wireless communication system supporting a proximity service are provided. The method for transmitting discovery information includes receiving, in a medium access control (MAC) layer, discovery information for discovery associated with the proximity service from a higher layer, generating, in the MAC layer, a MAC protocol data unit (PDU) including the received discovery informa- (Continued)

tion, and transmitting, in a physical (PHY) layer, a discovery signal including the generated MAC PDU.

18 Claims, 35 Drawing Sheets

(56) References Cited

U.S. PATENT DOCUMENTS

| | | | |
|---|---|---|---|
| 2008/0304408 A1* | 12/2008 | Kraemer | H04L 12/2803 370/230 |
| 2009/0325601 A1 | 12/2009 | Park et al. | |
| 2012/0163235 A1 | 6/2012 | Ho et al. | |
| 2013/0023267 A1 | 1/2013 | Ong et al. | |
| 2013/0084914 A1 | 4/2013 | Wu et al. | |
| 2014/0029596 A1* | 1/2014 | Li | H04W 48/16 370/338 |

* cited by examiner

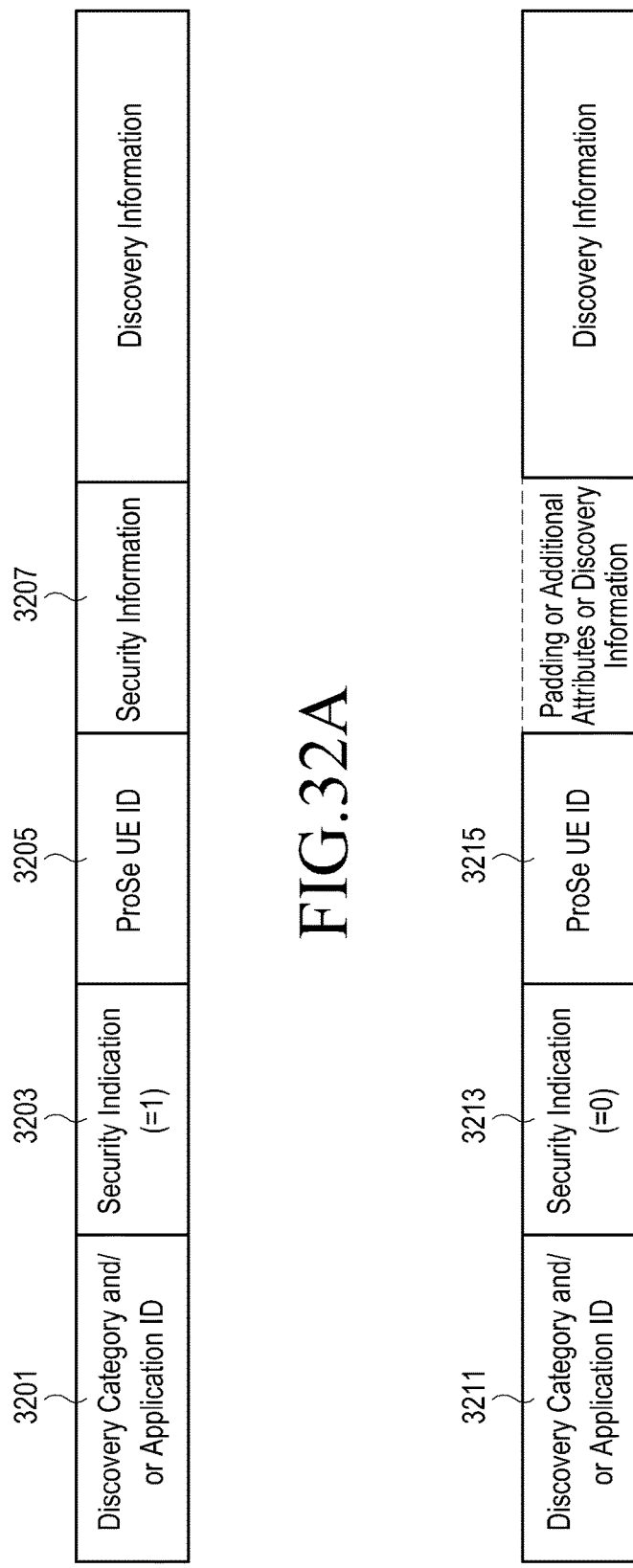

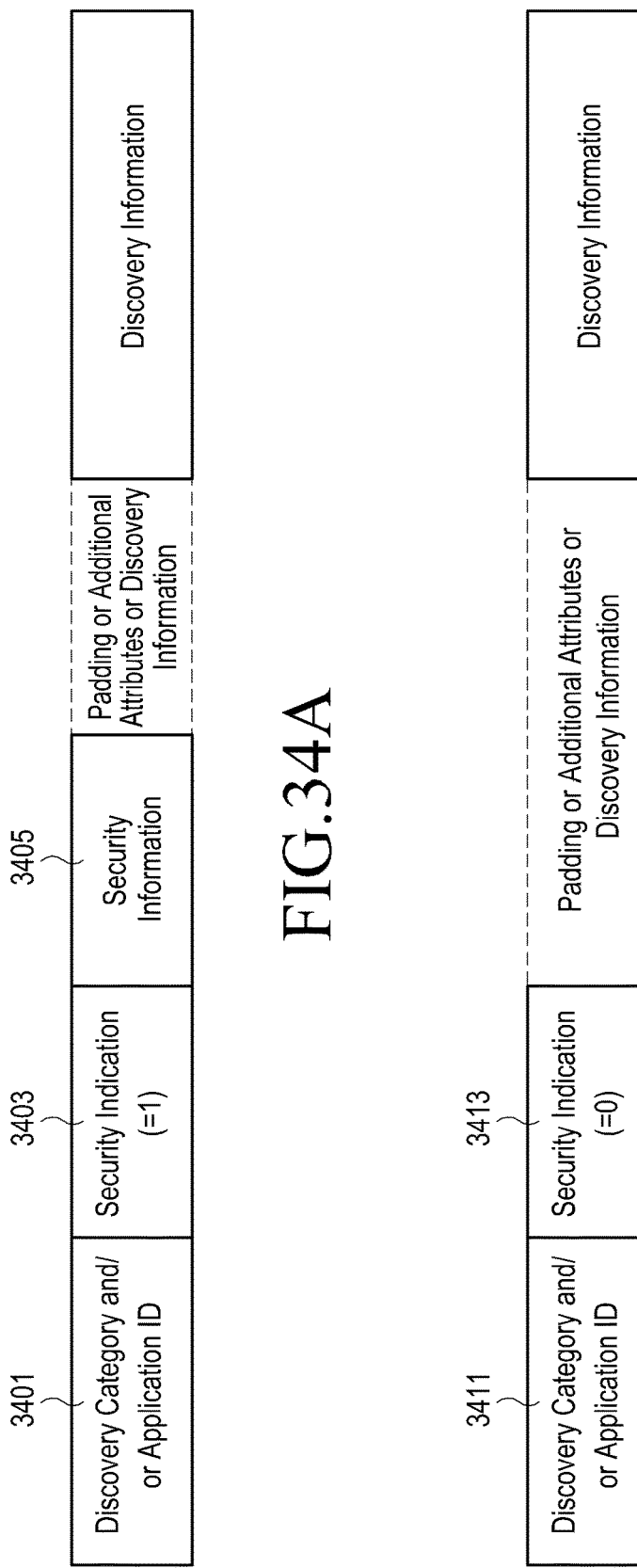

METHOD AND APPARATUS FOR TRANSMITTING AND RECEIVING DISCOVERY INFORMATION IN WIRELESS COMMUNICATION SYSTEM, AND PROTOCOL STACK ARCHITECTURE FOR THE SAME

CROSS-REFERENCE TO RELATED APPLICATION(S)

This application is a U.S. National Stage application under 35 U.S.C. § 371 of an International application filed on Jul. 10, 2014 and assigned application number PCT/KR2014/006194, which claimed the benefit of an Indian patent application filed on Jul. 10, 2013 in the Indian Patent Office and assigned Serial number 817/KOL/2013, the entire disclosure of which is hereby incorporated by reference.

TECHNICAL FIELD

To meet the demand for wireless data traffic having increased since deployment of 4G ($4^{th}$-generation) communication systems, efforts have been made to develop an improved 5G ($5^{th}$-generation) or pre-5G communication system. Therefore, the 5G or pre-5G communication system is also called a 'beyond 4G network' or a 'post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the internet of things (IoT) where distributed entities, such as things, exchange and process information without human intervention. The internet of everything (IoE), which is a combination of the IoT technology and the big data processing technology through connection with a cloud server, has emerged. As technology elements, such as "sensing technology", "wired/wireless communication and network infrastructure", "service interface technology", and "Security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

The present disclosure relates to a system and method for determining the proximity between two users based on a direct radio signal in a wireless communication system supporting a device-to-device (D2D) service. More particularly, the present disclosure relates to a method for receiving a discovery signal, and determining whether discovery information carried in the discovery signal is of interest to a receiving user equipment (UE) or not.

BACKGROUND

The existing way to monitor discovery information in a wireless communication system supporting device-to-device (D2D) discovery will be described with reference to FIG. 1.

FIGS. 1 and 2 illustrate the existing discovery information monitoring method in a wireless communication system supporting D2D communication according to the related art.

Referring to FIG. 1, discovery information may be transmitted on a discovery channel 101 by a proximity service (ProSe) user equipment (UE) (which supports a ProSe service or a D2D service, like discovery or communication). The ProSe UE may refer to a UE that uses a proximity service like the D2D service. The D2D service may be construed to include a variety of proximity services.

The ProSe UE interested in discovering other ProSe UEs may monitor the discovery information in which the ProSe UE is interested.

The ProSe UE may monitor the discovery channel(s) 101 for receiving the discovery information.

During the monitoring, the discovery channel 101 may be received and decoded by a physical (PHY) layer 111.

A discovery protocol data unit (PDU) 103 received in the discovery channel 101 may be processed (e.g., security-processed) by a protocol stack 113 of a user plane or control plane, and then, the discovery information may be sent to an application layer 115.

Applications 115-1, 115-2, . . . , 115-n in the application layer 115 or a ProSe manager 115a may determine whether a received discovery code/information 105a corresponds to an interest/user information 105b of the ProSe UE.

However, there are several issues in monitoring the discovery information in the existing system described in FIG. 1. The issues in a discovery information monitoring procedure in the existing system will be described with reference to FIG. 2.

Suppose that an application layer in a UE monitoring discovery information triggers to monitor the discovery information (e.g., a discovery code 'x') at time 't' (201) as illustrated in FIG. 2. In this case, the PHY layer in the UE may start monitoring a discovery channel. The discovery code 'x' may be received after time 't+monitoring duration 203 (205). In the example of FIG. 2, the UE may monitor four discovery sub-frames (SFs), each carrying N discovery channels. As a result of the discovery information monitoring procedure described earlier, the physical layer 111 in FIG. 1 may receive and decode a plurality of discovery physical channels (hereinafter, referred to as 'discovery channels') 101, in the situation of FIG. 2. The protocol stack 113 of the user plane or control plane may process many a plurality of discovery PDUs 103. In this case, the protocol stack 113 of the user plane or control plane may wake up the application layer 115 many times.

In the existing discovery information monitoring method, the UE may continuously monitor and decode all discovery channel resources for receiving and decoding the discovery physical channel. The protocol stack of the user plane or control plane of the UE may process each and every discovery PDU received on the discovery physical channel, and send the received discovery information to the application layer. Therefore, the application layer of the UE may be waked up every time a discovery PDU is received by the protocol stack of the user plane or control plane.

Therefore, the existing discovery information monitoring method may increase the processing burden of the UE in the process of transmitting and receiving discovery information, and may also increase the power consumption.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for efficiently transmitting and receiving discovery information for device-to-device (D2D) discovery in a wireless communication system supporting D2D communication.

Another aspect of the present disclosure is to provide a method and apparatus for pre-filtering discovery information for D2D discovery in a wireless communication system supporting D2D communication.

Another aspect of the present disclosure is to provide an efficient protocol stack architecture for a discovery protocol data unit (PDU) in a wireless communication system supporting D2D communication.

In accordance with an aspect of the present disclosure, a method for transmitting discovery information by a user equipment (UE) in a wireless communication system supporting a proximity service is provided. The method includes receiving, in a medium access control (MAC) layer, discovery information for discovery associated with the proximity service from a higher layer, generating, in the MAC layer, a MAC PDU including the received discovery information, transmitting, in a physical (PHY) layer, a discovery signal including the generated MAC PDU.

In accordance with another aspect of the present disclosure, a UE for transmitting discovery information in a wireless communication system supporting a proximity service is provided. The UE includes a transmitter configured to transmit a signal. The UE further includes a controller configured to control to receive, in a MAC layer, discovery information for discovery associated with the proximity service from a higher layer, generate, in the MAC layer, a MAC PDU including the received discovery information, and transmit, in a PHY layer, a discovery signal including the generated MAC PDU.

In accordance with another aspect of the present disclosure, a method for receiving discovery information by a UE in a wireless communication system supporting a proximity service is provided. The method includes receiving, in a PHY layer, a discovery signal including a MAC PDU, the discovery signal including discovery information for discovery associated with the proximity service, extracting, from a MAC layer, the discovery information included in the received MAC PDU, and forwarding, in the MAC layer, the extracted discovery information to a higher layer.

In accordance with another aspect of the present disclosure, a UE for receiving discovery information in a wireless communication system supporting a proximity service is provided. The UE includes a receiver configured to receive a signal. The UE further includes a controller configured to control to, receive, in a PHY layer, a discovery signal including a MAC PDU, the discovery signal including discovery information for discovery associated with the proximity service, extract, from a MAC layer, the discovery information included the received MAC PDU, and forward, in the MAC layer, the extracted discovery information to a higher layer.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 32A and 32B illustrate a configuration of header information added to discovery information according to various embodiments of the present disclosure;

FIGS. 34A and 34B illustrate a configuration of header information added to discovery information according to various embodiments of the present disclosure.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

In accordance with an embodiment of the present disclosure, discovery information for device-to-device (D2D) discovery transmitted on a discovery physical channel (hereinafter, referred to as a 'discovery channel') may be pre-filtered in a physical (PHY) layer and/or a medium access control (MAC) layer and/or other layers below an application layer, instead of being pre-filtered at the application layer.

In the present disclosure, the following discovery information pre-filtering methods will be proposed.

First Embodiment of Pre-filtering Method (Pre-Filtering Using Cyclic Redundancy Check (CRC))

In this proposed pre-filtering method, a pre-filtering parameter (e.g., application identifier (ID), application user ID, discovery category, discovery type, discoverable user equipment's (UE's) ID, discovering UE's ID, bits of discovery information, etc.), based on which discovery information of UE's interest (e.g., discovery information preferred by the UE) can be filtered, may be encoded in a CRC of a discovery protocol data unit (PDU).

Figure 1:
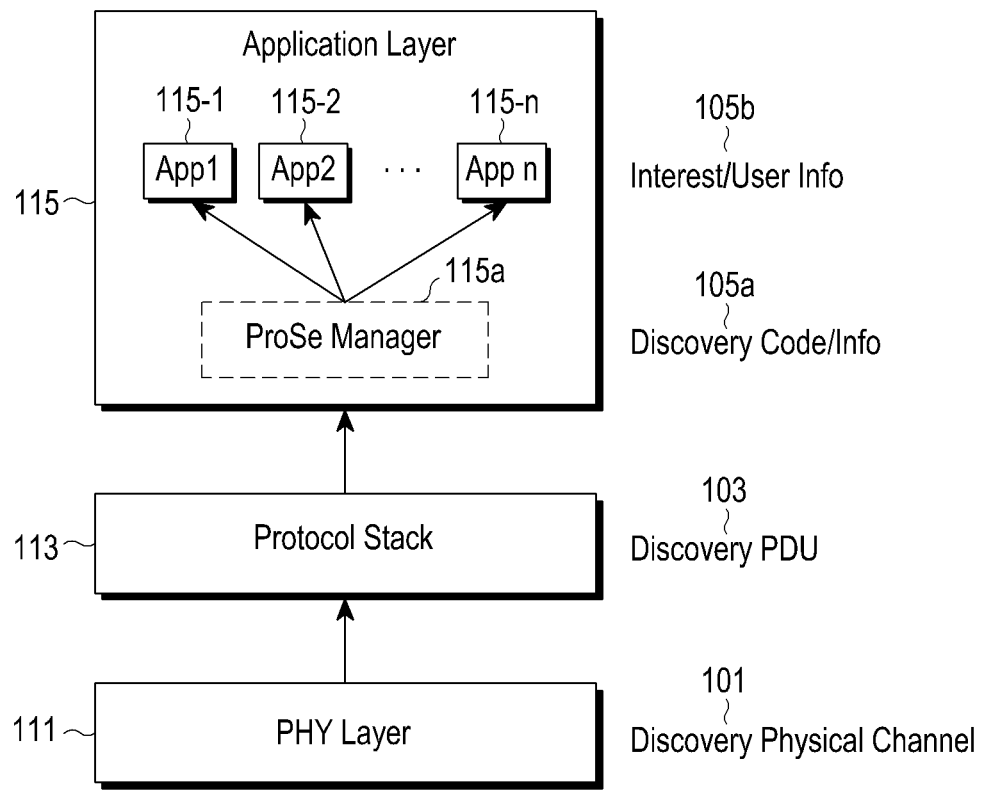
FIGS. 1 and 2 illustrate the existing discovery information monitoring method in a wireless communication system supporting device-to-device (D2D) communication according to the related art.
Figure 2:
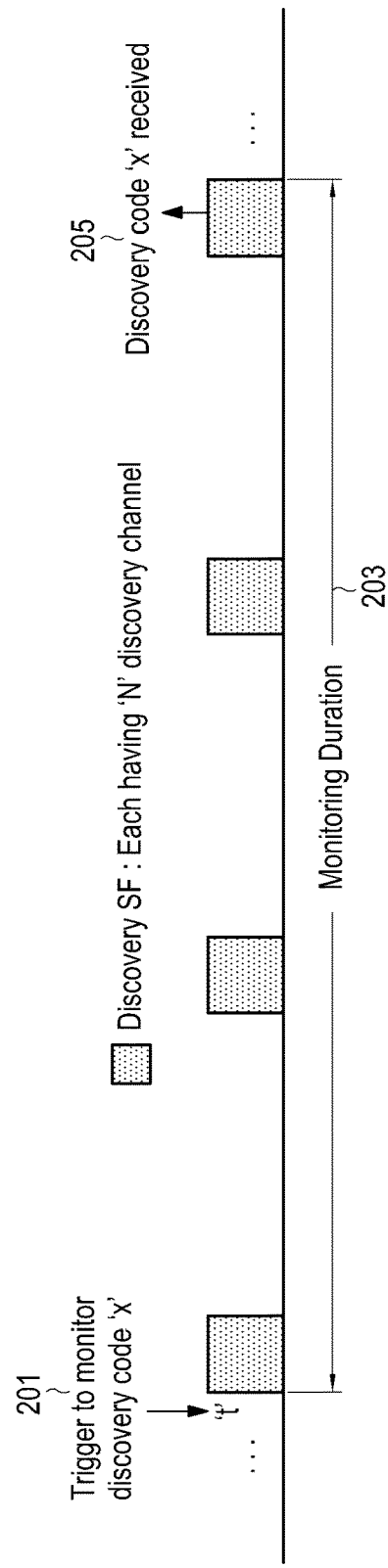
Figure 3:
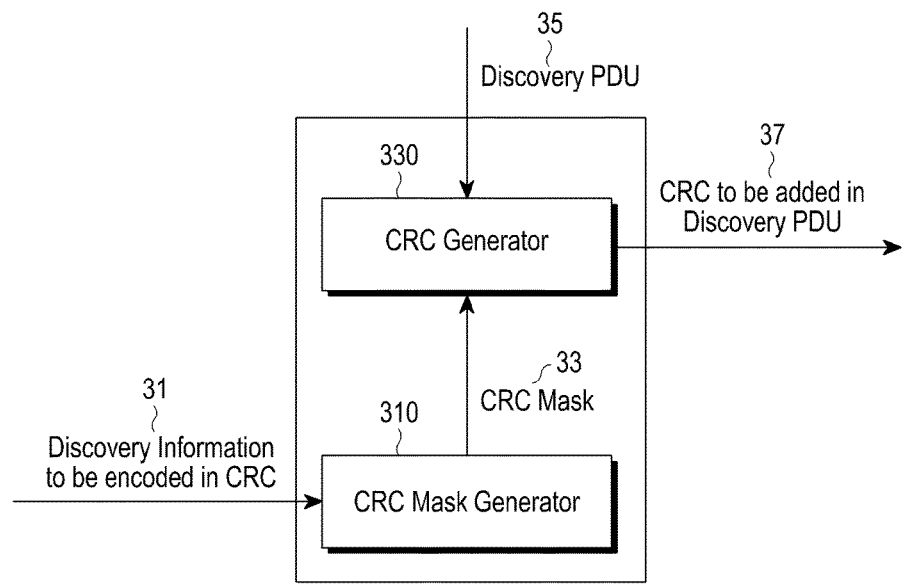
FIG. 3 illustrates a method of encoding discovery information using a cyclic redundancy check (CRC) in a wireless communication system according to an embodiment of the present disclosure.

FIG. 3 illustrates a method of encoding discovery information using a CRC in a wireless communication system according to an embodiment of the present disclosure.

Referring to FIG. 3, the pre-filtering parameter may be encoded in the CRC by generating a CRC mask 33 corresponding to discovery information 31 of UE's interest. In FIG. 3, a CRC mask generator 310 may generate the CRC mask 33 and a CRC generator 330 may generate a CRC 37 of a discovery PDU 35. The generated CRC mask 33 may be used to generate the CRC 37 of the discovery PDU 35. Then, the CRC 37 may be added to the discovery PDU 35 by a PHY layer. In an embodiment, the CRC 37 may be generated and added by a MAC layer, a radio resource control (RRC) layer, a packet data convergence protocol (PDCP) layer or any other layer.

In a transmitting UE, a higher layer (e.g., an application layer or a D2D protocol layer or entity) may send a pre-filtering parameter to be encoded in the CRC to a protocol stack. In an embodiment, the protocol stack may be a $3^{rd}$ Generation Partnership Project (3GPP) protocol stack that includes various layers such as RRC layer, PDCP layer, radio link control (RLC) layer, MAC layer, etc. The protocol stack may configure the pre-filtering parameter to be encoded in the CRC in the PHY layer. In an embodiment, the protocol stack may send the pre-filtering parameter to be encoded in the CRC along with the discovery PDU to be transmitted on the discovery channel to the PHY layer. The PHY layer may encode the pre-filtering parameter in the CRC and transmit the discovery PDU on the discovery channel.

In a monitoring UE, the higher layer (e.g., an application layer or a D2D protocol layer or entity) may send the pre-filtering parameter to be monitored in the CRC, to the protocol stack. The protocol stack may configure the pre-filtering parameter to be monitored in the CRC in the PHY layer. The PHY layer in the monitoring UE may check the CRC corresponding to its interested discovery information using the pre-filtering parameter. If the CRC is passed, the PHY Layer may send the discovery PDU to the protocol stack. Otherwise, the PHY layer may discard the received discovery information.

In an embodiment, the pre-filtering parameter may be encoded in a CRC mask of every discovery PDU transmitted on a discovery channel. If no discovery information needs to be encoded, a null mask may be used. In an embodiment, the pre-filtering parameter may be encoded in a CRC mask of selective discovery PDUs. These selective discovery PDUs may be of a specific discovery category or discovery interest group. The monitoring UE may determine whether the pre-filtering parameter is encoded in the CRC in one of the following ways a) and b):

a) Resources used for a discovery channel with a discovery PDU CRC carrying the discovery information may be different from resources used for a discovery channel with a discovery PDU CRC not carrying the discovery information.

b) Discovery preamble(s) used for a discovery channel with a discovery PDU CRC carrying the discovery information may be different from discovery preamble(s) used for a discovery channel with a discovery PDU CRC not carrying the discovery information.

The advantage of pre-filtering discovery information using the CRC is that the protocol stack does not need to process each discovery PDU received on the discovery channel during the monitoring duration. As a result, the wakeup time and processing time of a processor running the protocol stack and a processor running the application may be significantly reduced.

This may improve the battery life of UEs supporting D2D services.

Second Embodiment of Pre-filtering Method (Discovery Preamble)

In the PHY layer, the discovery preamble may be transmitted to provide timing synchronization to the monitoring UE.

Figure 4:
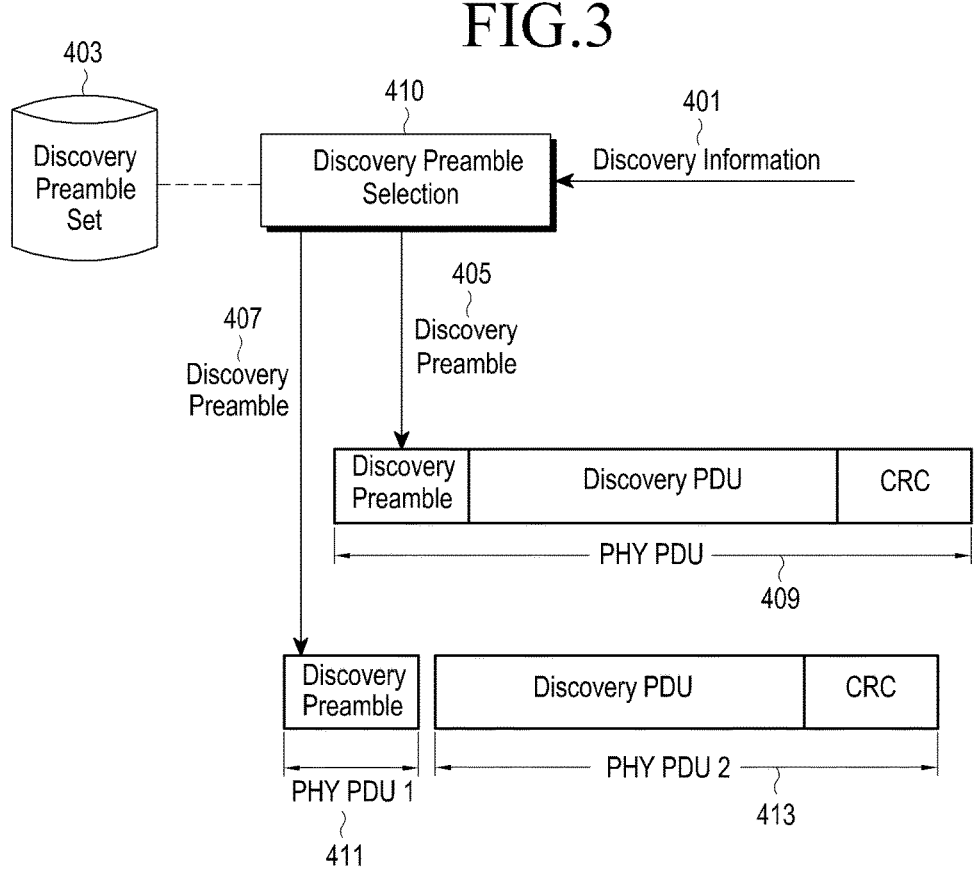
FIG. 4 illustrates a method of encoding discovery information in a discovery preamble in a wireless communication system according to an embodiment of the present disclosure.

FIG. 4 illustrates a method of encoding discovery information in a discovery preamble in a wireless communication system according to an embodiment of the present disclosure.

Referring to FIG. 4, in this proposed pre-filtering method, in order to perform pre-filtering in addition to timing synchronization, a set 403 of discovery preambles may be reserved. Each of discovery preambles 405 and 407 may correspond to predefined discovery information 401 (e.g., discovery information category or discovery type). A discovery preamble may precede the discovery PDU on the discovery channel. In the transmitting UE, the PHY layer may transmit the discovery preambles 405 and 407 corresponding to the discovery information 401 transmitted on the discovery channel.

In the transmitting UE, the higher layer may send the discovery information and its type or category to the protocol stack. In an embodiment, the protocol stack may be the protocol stack that includes various layers such as RRC layer, PDCP layer, RLC layer, MAC layer, etc. The protocol stack may send the discovery information to the PHY layer along with the type of the preamble to be used for this discovery information. The protocol stack may maintain, through discovery preamble selection 410, the mapping between the discovery preamble and discovery information types or discovery information which needs to be pre-filtered based on the discovery preamble. The PHY layer may transmit the indicated discovery preamble and the discovery PDU on the discovery channel. In FIG. 4, reference numerals 409, 411 and 413 represent PHY PDUs. The PHY PDU 409 may, for example, be configured to include a discovery preamble, a discovery PDU and a CRC. The discovery preamble may be transmitted in a separate PHY PDU 411.

In the monitoring UE, the higher layer may send the discovery information and its type or discovery information which needs to be pre-filtered based on the discovery preamble, to the protocol stack. The protocol stack may configure the discovery preambles to be monitored in the PHY layer. The PHY layer in the monitoring UE may check the preamble corresponding to its interested discovery information. The PHY layer may decode the discovery channel information if the preamble corresponds to its interested discovery information. The PHY layer may then send the discovery PDU if the decoding is successful.

In an embodiment of the present disclosure, the pre-filtering parameter (e.g., application ID, application user ID, discovery category, discovery type, discoverable UE's ID, discovering UE's ID, bits of discovery information, etc.), based on which discovery information of UE's interest can be filtered, may be encoded in the discovery preamble by generating a preamble mask specific to the pre-filtering parameter.

The advantage of pre-filtering discovery information using the discovery preamble is that the PHY layer in the monitoring UE does not need to decode each and every discovery channel during the monitoring duration. The PHY layer may only decode the discovery channel for which the discovery preamble belongs to the discovery category in which the UE is interested. As a result, the wakeup time and processing time of a processor running the protocol stack and a processor running the application and processing time in the PHY layer may be significantly reduced. This may improve the battery life of UEs supporting D2D services.

Third Embodiment of Pre-filtering Method (Discovery Resource Categorization)

In this proposed pre-filtering method, different discovery resources may be reserved or allocated for different types or category of discovery information. In the transmitting UE, the higher layer may send the discovery information and its type or category to the protocol stack. In an embodiment, the protocol stack may be the protocol stack that includes various layers such as RRC layer, PDCP layer, RLC layer, MAC layer, etc. The protocol stack may send the discovery information to the PHY layer along with the type or category of resources to be used for this discovery information. The protocol stack may maintain the mapping between discovery resources and discovery information types/category or discovery information which needs to be pre-filtered based on the discovery resources. The PHY layer may transmit the discovery PDU on a discovery channel on the indicated discovery resources.

In the monitoring UE, the application layer may send the discovery information and its type or discovery information which needs to be pre-filtered based on the discovery resources, to the protocol stack. The protocol stack may configure the discovery resources to be monitored in the PHY layer. The PHY layer in the monitoring UE may look for a discovery channel in the discovery resources corresponding to its interested discovery information.

The discovery resources for a specific type of discovery information may be signaled using a physical downlink control channel (PDCCH) or a system information block (SIB). A different cell-radio network temporary identifier (C-RNTI) or indicator in the PDCCH or SIB may indicate a discovery category. A different discovery sub-frame (SF) may be for a different discovery category. In a discovery SF, a different discovery channel may be assigned for different type or category of discovery dynamically or semi-statically. For example, discovery resources may be separately indicated for public safety and commercial usage. The PS indicator field in the signaling indicates whether the resources are for public safety or commercial usage. For public safety discovery usage, the transmitter/receiver will use discovery resources from the resources for public safety indicated using the PS indicator. The advantage of pre-filtering discovery information using the discovery resource categorization is that the UE does not have to monitor all the discovery resources when the UE starts monitoring. This leads to the reduced physical layer processing, protocol stack processing and application layer processing.

Fourth Embodiment of Pre-Filtering Method (Header/Other Information in Discovery PDU)

In this proposed pre-filtering method, the discovery information of UE's interest may be encoded in a discovery PDU header or inside the discovery PDU. In the monitoring UE, the higher layer may send the discovery information of UE's interest to the protocol stack.

In an embodiment, the protocol stack may be the protocol stack that includes various layers such as RRC layer, PDCP layer, RLC layer, MAC layer, etc. The protocol stack in the monitoring UE may pre-filter the information in the decoded discovery PDU received from the PHY layer. The protocol stack may use the header information in a discovery PDU to pre-filter the discovery information. The protocol stack may check the information in the discovery PDU header corresponding to its interested discovery information. Further processing (e.g., security verification, etc.) of the discovery PDU may be performed only if the interested discovery information is found. The protocol stack may also use information in the discovery PDU other than header to filter the discovery information.

Discovering Information Monitoring Using Pre-Filtering

The UE may use at least one of the aforementioned pre-filtering methods for pre-filtering the discovery information.

Figure 5:
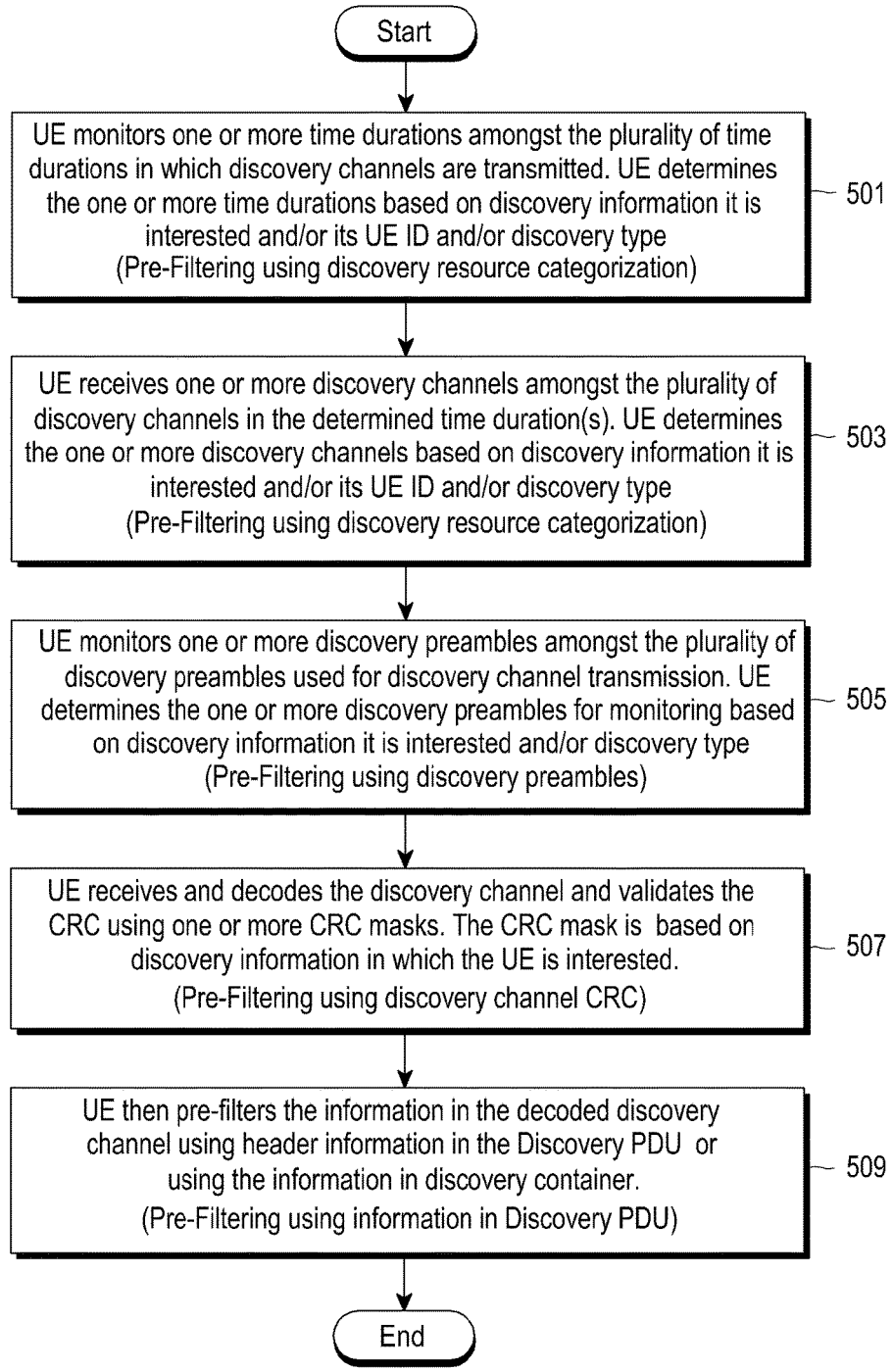
FIG. 5 is a flowchart illustrating a user equipment's (UE's) operation for pre-filtering in a wireless communication system according to an embodiment of the present disclosure.

FIG. 5 is a flowchart illustrating a UE's operation for pre-filtering in a wireless communication system according to an embodiment of the present disclosure.

Referring to FIG. 5, the higher layer (e.g., an application layer or a D2D protocol layer or entity) in the monitoring UE may trigger monitoring of a discovery channel. The various operations performed by the UE are as follows:

Operation 501: The UE may monitor one or more time durations amongst the plurality of time durations in which discovery channels are transmitted. The UE may determine the one or more time durations based on the discovery information the UE is interested in, and/or its UE ID. In operation 501, the UE may be pre-filtering discovery information using discovery resource categorization. This pre-filtering may be performed in the MAC/PHY layer.

Operation 503: The UE may receive one or more discovery channels amongst the plurality of discovery channels in the determined time durations. The UE may determine the one or more discovery channels based on the discovery information the UE is interested in, and/or its UE ID. In operation 503, the UE may be pre-filtering discovery information using discovery resource categorization. This pre-filtering may be performed in the PHY layer.

Operation 505: The UE may monitor one or more discovery preambles amongst the plurality of discovery preambles used for discovery channel transmission. The UE may determine the one or more discovery preambles based on the discovery information the UE is interested in. In operation 505, the UE may be pre-filtering discovery information using discovery preambles. This pre-filtering may be performed in the PHY layer.

Operation 507: The UE may receive and decode the determined discovery channel, and validate a CRC using one or more CRC masks. The CRC mask may be based on the discovery information the UE is interested in. In operation 507, the UE may be pre-filtering discovery information using a discovery channel CRC. This pre-filtering may be performed in the PHY layer.

Operation 509: The UE may then pre-filter the information in the decoded discovery channel, using header information in a discovery PDU or using the information in a discovery container. In operation 509, the UE may be pre-filtering discovery information using information in the discovery PDU. This pre-filtering may be performed in the protocol stack.

At least one of operations 501 to 509 may be selectively performed. The application layer or the ProSe manager in the UE may then pre-filter the received discovery information in the UE in accordance with at least one of operations 501 to 509.

Figure 6:
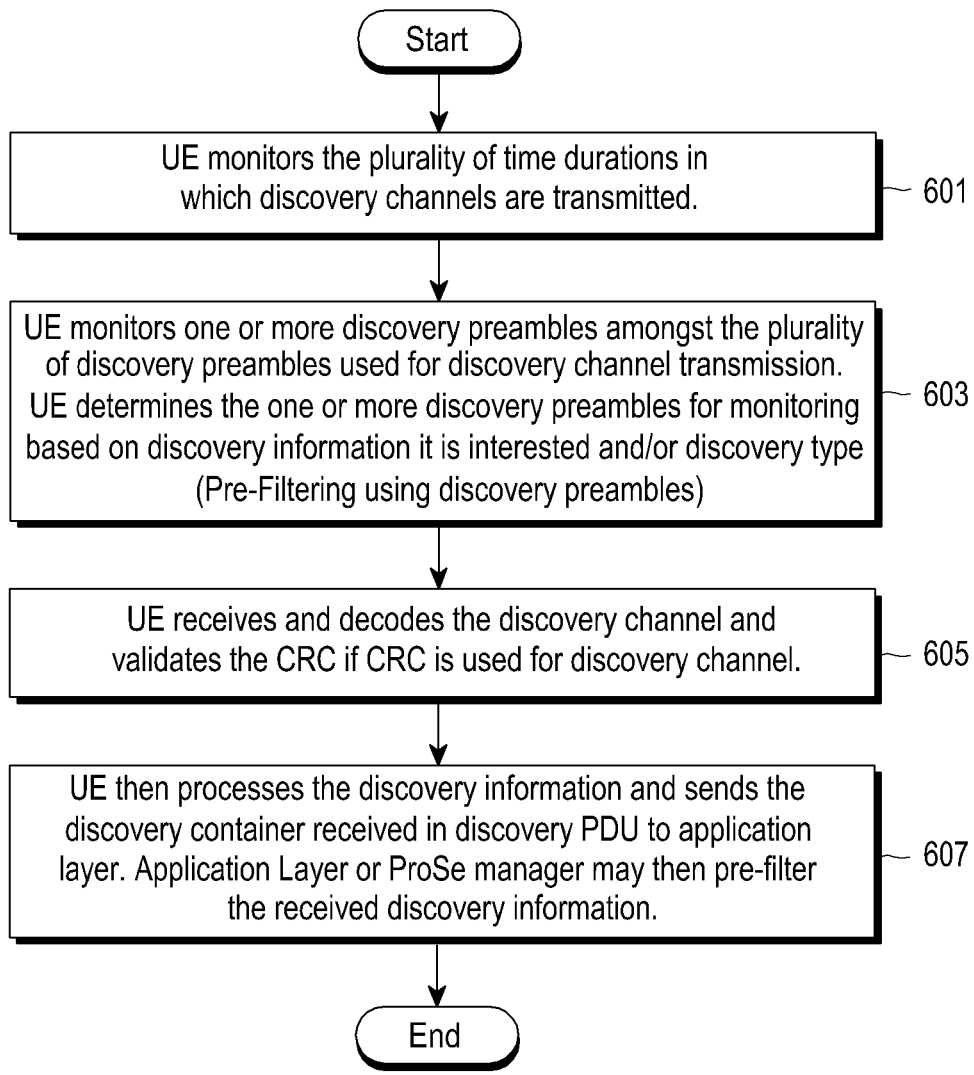
FIG. 6 is a flowchart illustrating a UE's operation for pre-filtering in a wireless communication system according to an embodiment of the present disclosure.

FIG. 6 is a flowchart illustrating a UE's operation for pre-filtering in a wireless communication system according to an embodiment of the present disclosure.

Referring to FIG. 6, the higher layer (e.g., an application layer or a D2D protocol layer or entity) in the monitoring UE may trigger monitoring of a discovery channel. The various operations performed by the UE are as follows:

Operation 601: The UE may monitor a plurality of time durations in which discovery channels are transmitted.

Operation 603: The UE may monitor one or more discovery preambles amongst the plurality of discovery preambles used for discovery channel transmission. The UE may determine the one or more discovery preambles based on the discovery information the UE is interested in. In operation 603, the UE may be pre-filtering discovery information using discovery preambles. This pre-filtering may be performed in the PHY layer.

Operation 605: The UE may receive and decode the determined discovery channel, and validate the CRC if the CRC is used for the discovery channel.

Operation 607: The UE may then process the discovery information, and send a discovery container received in a discovery PDU, to the application layer. The application layer or the ProSe manager in the UE may then pre-filter the received discovery information in the UE.

Figure 7:
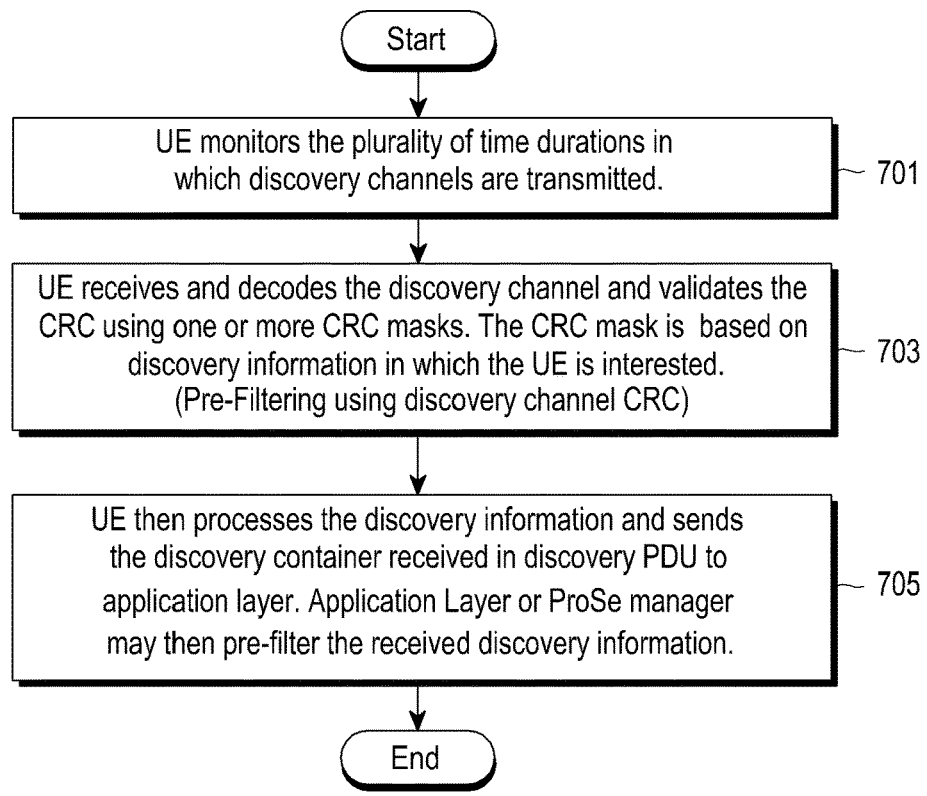
FIG. 7 is a flowchart illustrating a UE's operation for pre-filtering in a wireless communication system according to an embodiment of the present disclosure.

FIG. 7 is a flowchart illustrating a UE's operation for pre-filtering in a wireless communication system according to an embodiment of the present disclosure.

Referring to FIG. 7, the higher layer (e.g., an application layer or a D2D protocol layer or entity) in the monitoring UE may trigger monitoring of a discovery channel. The various operations performed by the UE are as follows:

Operation 701: The UE may monitor a plurality of time durations in which discovery channels are transmitted.

Operation 703: The UE may receive and decode the discovery channel, and validate the CRC using one or more CRC masks. The CRC mask may be based on the discovery information in which the UE is interested.

Operation 705: The UE may then process the discovery information, and send a discovery container received in a discovery PDU to the application layer. The application layer or the ProSe manager in the UE may then pre-filter the received discovery information in the UE.

Figure 8:
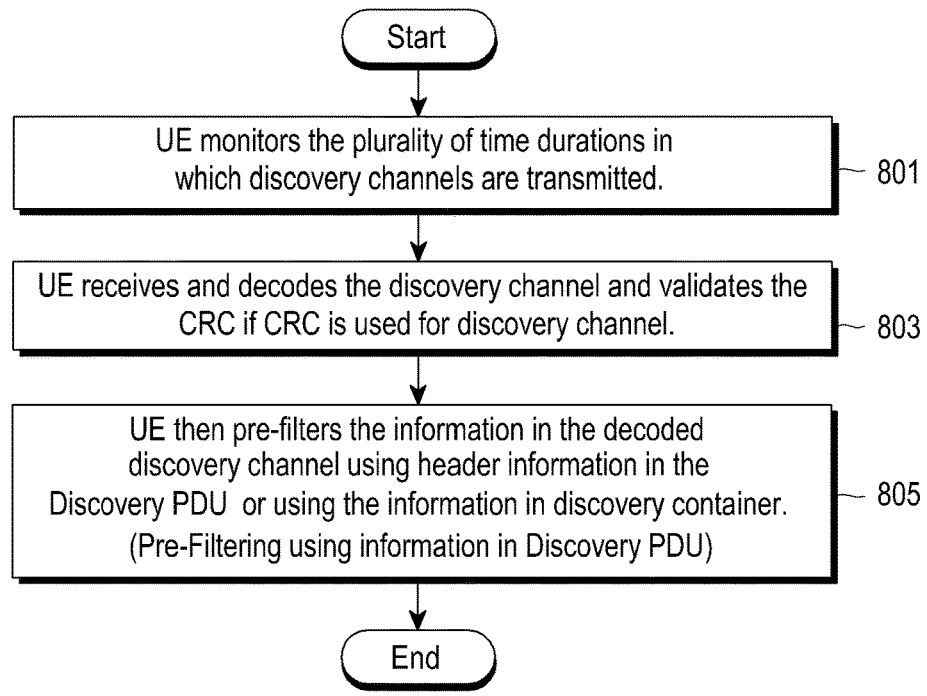
FIG. 8 is a flowchart illustrating a UE's operation for pre-filtering in a wireless communication system according to an embodiment of the present disclosure.

FIG. 8 is a flowchart illustrating a UE's operation for pre-filtering in a wireless communication system according to an embodiment of the present disclosure.

Referring to FIG. 8, the higher layer (e.g., an application layer or a D2D protocol layer or entity) in the monitoring UE may trigger monitoring of a discovery channel. The various operations performed by the UE are as follows:

Operation 801: The UE may monitor a plurality of time durations in which discovery channels are transmitted.

Operation 803: The UE may receive a plurality of discovery channels in the determined time durations. The UE may receive and decode the determined discovery channel, and validate the CRC if the CRC is used for a discovery channel.

Operation 805: The UE may then pre-filter the information in the decoded discovery channel, using header information in the discovery PDU or using the information in the discovery container. In operation 805, the UE may be pre-filtering discovery information using information in discovery PDU. This pre-filtering may be performed in the protocol stack. The application layer or the ProSe manager in the UE may then pre-filter the received discovery information in the UE.

Figure 9:
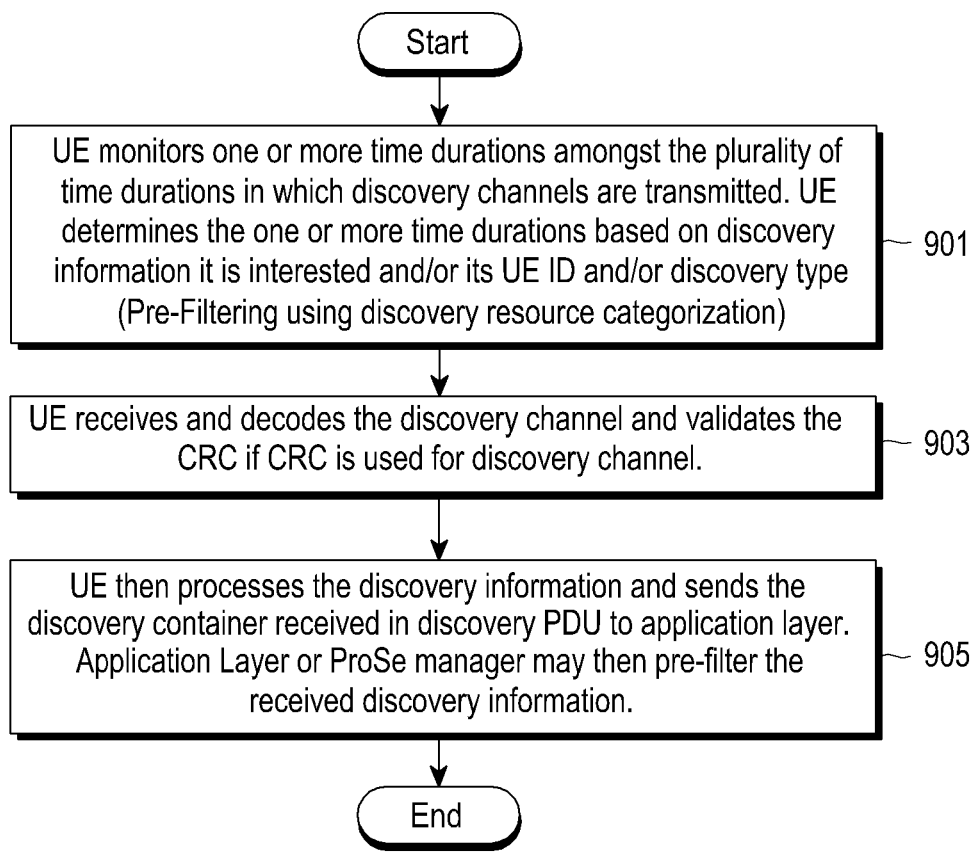
FIG. 9 is a flowchart illustrating a UE's operation for pre-filtering in a wireless communication system according to an embodiment of the present disclosure.

FIG. 9 is a flowchart illustrating a UE's operation for pre-filtering in a wireless communication system according to an embodiment of the present disclosure.

Referring to FIG. 9, the application layer in the monitoring UE may trigger monitoring of a discovery channel. The various operations performed by the UE are as follows:

Operation 901: The UE may monitor one or more time durations amongst the plurality of time durations in which discovery channels are transmitted. The UE determines the one or more time durations based on the discovery information the UE is interested in, and/or its UE ID. In operation 901, the UE may be pre-filtering discovery information using discovery resource categorization. This pre-filtering may be performed in the MAC/PHY layer.

Operation 903: The UE may receive and decode the determined discovery channel, and validate the CRC if the CRC is used for a discovery channel.

Operation 905: The UE may then process the discovery information, and send a discovery container received in a discovery PDU to the application layer. The application layer or the ProSe manager in the UE may then pre-filter the received discovery information in the UE.

Although various pre-filtering methods have been described in the embodiments of FIGS. 5 to 9, it is to be noted that other combination of pre-filtering methods are also possible. For example, the discovery preamble plus the discovery channel CRC may both be used to pre-filter discovery information. The discovery resource categorization together with the discovery preamble may also be used for pre-filtering the discovery information. The discovery resource categorization together with the discovery channel CRC may also be used for pre-filtering the discovery information.

Pre-Filtering Using Application ID

Various embodiments of pre-filtering discovery information using an application ID will now be described with reference to FIGS. 10A to 12B.

Figure 10A:
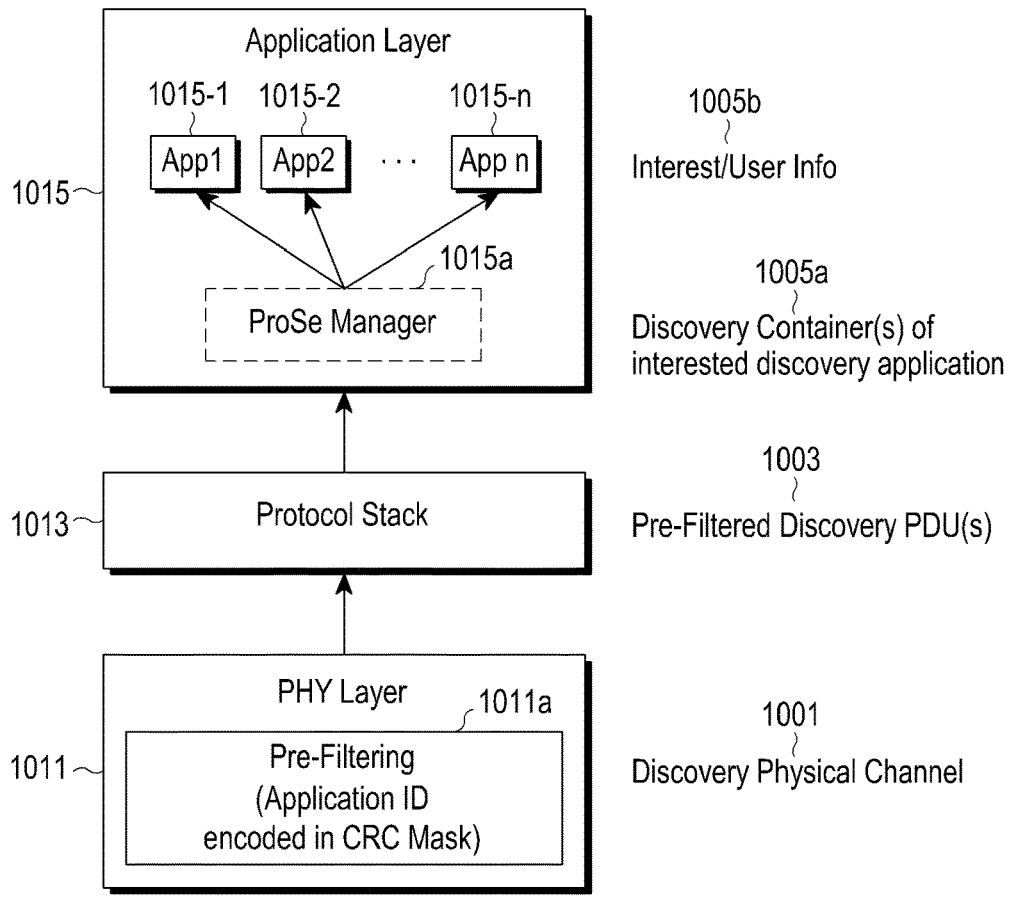
FIGS. 10A and 10B illustrate a method of performing pre-filtering using an application identifier (ID) in a wireless communication system according to various embodiments of the present disclosure.
Figure 10B:
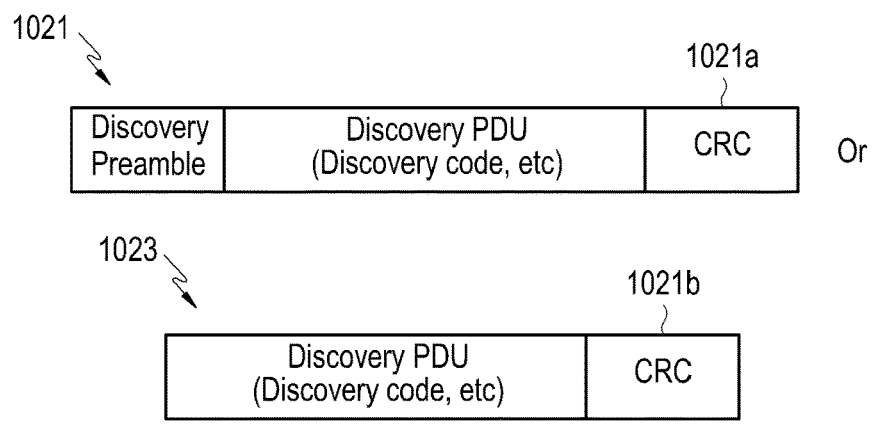

FIGS. 10A and 10B illustrate a method of performing pre-filtering using an application ID in a wireless communication system according to various embodiments of the present disclosure.

Referring to FIG. 10A, discovery information may be transmitted on a discovery physical channel 1001 by a ProSe UE (which supports a ProSe service or a D2D service, like discovery or communication). An application ID may be used to pre-filter the discovery information transmitted on the discovery physical channel 1001.

Referring to FIG. 10B, reference numeral 1021 or 1023 represents an example of a configuration of a PHY PDU carrying a discovery PDU. The application ID may be encoded in a CRC 1021*a* (or 1021*b* in FIG. 10B) of the discovery PDU. The application ID may be encoded in the CRC 1021*a* (or 1021*b*) by generating a CRC mask corresponding to the application ID.

The generated CRC mask may then be used to generate the CRC of the discovery PDU. The CRC may then be added to the discovery PDU by the PHY layer. In an embodiment, the CRC may be generated and added by the MAC layer, the RRC layer, the PDCP layer or any other layer.

In the transmitting UE, the higher layer (e.g., an application layer or a D2D protocol layer or entity) may send the application ID to be encoded in the CRC, to the protocol stack. In an embodiment, the protocol stack may be the protocol stack that includes various layers such as RRC layer, PDCP layer, RLC layer, MAC layer, etc. The protocol stack may configure the application ID to be encoded in the CRC in the PHY layer. In an embodiment, the protocol stack may send the application ID to be encoded in the CRC along with the discovery PDU to be transmitted on the discovery channel. The PHY layer may encode the application ID in the CRC, and transmit the discovery PDU on the discovery channel.

Referring to FIG. 10A, in the monitoring UE, a higher layer (e.g., an application layer or a D2D protocol layer or entity) 1015 may send the application ID to be monitored in the CRC, to a protocol stack 1013. The protocol stack 1013 may configure the application ID to be monitored in the CRC in a PHY layer 1011. The PHY layer 1011 in the monitoring UE may check the CRC corresponding to its interested application ID to pre-filter the discovery information. If the CRC is passed, the PHY layer 1011 may send a pre-filtered discovery PDU 1003 to the protocol stack 1013. Otherwise the PHY layer 1011 may discard the received discovery information. The pre-filtered discovery PDUs 1003 may then be processed by the protocol stack 1013 and a discovery container 1005*a* inside the discovery PDU may be sent to the application layer 1015. Therefore, the applications 1015-1, 1015-2, ..., 1015-*n* in the application layer 1015 or the ProSe manager 1015*a* may determine that the pre-filtered discovery code/information in the discovery container 1005*a* corresponds to its interest/user information 1005*b*.

Figure 11A:
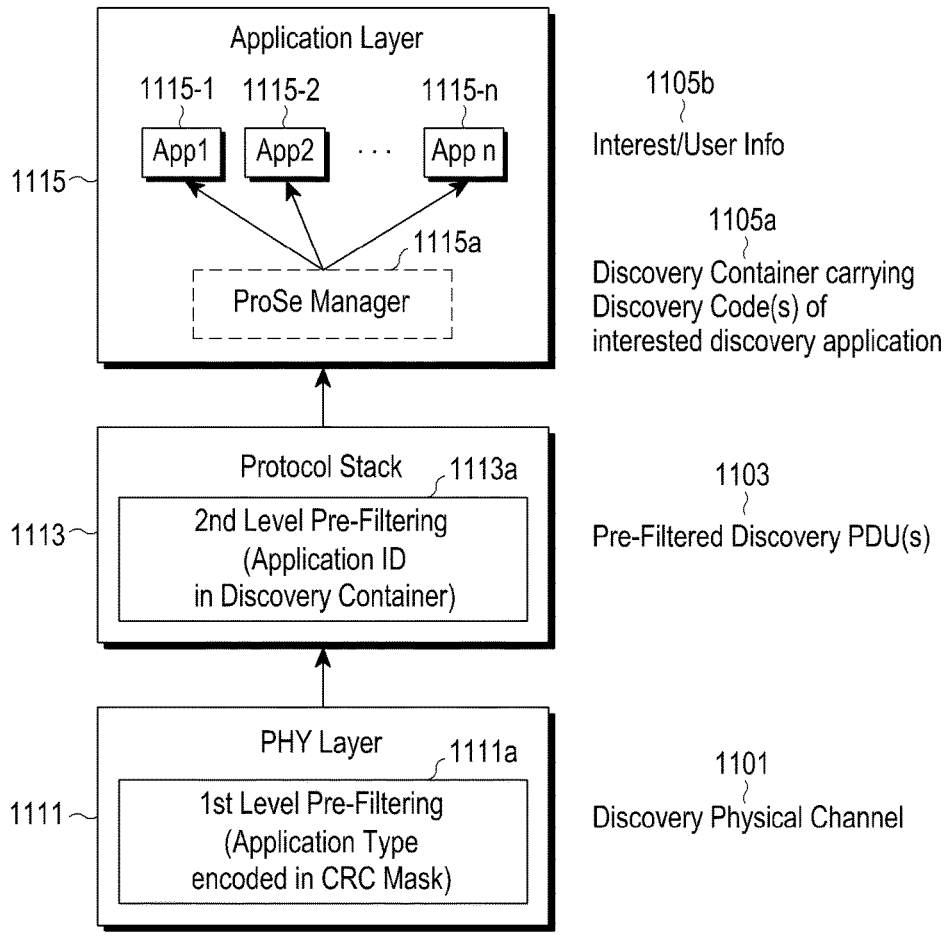
FIGS. 11A and 11B illustrate a method of performing pre-filtering using an application ID in a wireless communication system according to various embodiments of the present disclosure.
Figure 11B:
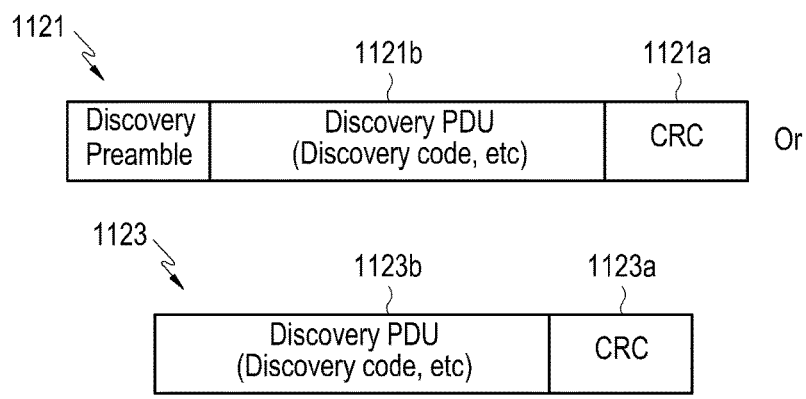

FIGS. 11A and 11B illustrate a method of performing pre-filtering using an application ID in a wireless communication system according to various embodiments of the present disclosure.

In this embodiment, the application may be identified using an application type and application ID. The application ID may be specific to the application type.

Referring to FIG. 11A, discovery information may be transmitted on a discovery physical channel 1101 by a ProSe UE (which supports a ProSe service or a D2D service, like discovery or communication). The application type and the application ID may be used to pre-filter the discovery information transmitted on the discovery physical channel 1101. In FIG. 11B, reference numeral 1121 or 1123 represents an example of a configuration of a PHY PDU carrying a discovery PDU.

Referring to FIG. 11B, the application type may be encoded in a CRC 1121*a* or 1123*a* of a discovery PDU 1121*b* or 1123*b*. The application type may be encoded in the CRC 1121*a* or 1123*a* by generating a CRC mask corresponding to the application type. The generated CRC mask may then be used to generate the CRC of the discovery PDU. The CRC may then be added to the discovery PDU by the PHY layer. In an embodiment, the CRC may be generated and added by the MAC layer, the RRC layer, the PDCP layer or any other layer.

In this embodiment, the application ID may be encoded in the discovery PDU. The application ID may be encoded in the discovery PDU header, or in the discovery container in the discovery PDU.

In the transmitting UE, the higher layer (e.g., an application layer or a D2D protocol layer or entity) may send the application type to be encoded in the CRC, to the protocol stack. The protocol stack may configure the application type to be encoded in the CRC in the PHY layer. In an embodiment, the protocol stack may send the application type to be encoded in the CRC along with the discovery PDU to be transmitted on the discovery channel. The PHY layer may encode the application type in the CRC, and transmit the discovery PDU on a discovery channel. In an embodiment, the application layer may encode the application ID in the discovery container. In an embodiment, the application layer may send the application ID to the protocol stack. The protocol stack may encode the application ID in the discovery PDU header.

Referring to FIG. 11A, in the monitoring UE, an application layer 1115 may send the application type and the application ID to be monitored, to a protocol stack 1113. The protocol stack 1113 may configure the application type to be monitored in the CRC in a PHY layer 1111. The PHY layer 1111 in the monitoring UE may check the CRC corresponding to its interested application type to primarily pre-filter the discovery information 1111*a*.

If the CRC is passed, the PHY layer 1111 may send a pre-filtered discovery PDU 1103 to the protocol stack 1113. Otherwise, the PHY layer 1111 may discard the received discovery information. The pre-filtered discovery PDUs 1103 may then be processed by the protocol stack 1113. The protocol stack 1113 may check the application ID of its interest in the discovery PDU header or the discovery container in the discovery PDU, to secondarily pre-filter the discovery information 1113*a*.

If the application ID of its interest is found in the protocol stack 1113, then only further processing (e.g., security verification, decoding, etc.) of the discovery container may be performed, and the discovery container inside the discovery PDU 1103 may be sent to the application layer 1115. Therefore, the applications 1115-1, 1115-2, ..., 1115-*n* in the application layer 1115 or the ProSe manager 1115*a* may determine that a pre-filtered discovery code/information in a discovery container 1105*a* corresponds to its interest/user information 1105*b*.

In an embodiment, the application ID may be divided into two parts. In this case, a first part of the application ID may be encoded in a discovery PDU CRC, and a second part may be encoded in the discovery PDU header, or inside the discovery container in the discovery PDU. The first part may be 'x' most significant bits (MSBs) of the application ID, and the second part may be 'y' least significant bits (LSBs) of the application ID, where 'x+y' is the total number of bits in the application ID. Alternately, the first part may be 'x' LSBs of the application ID, and the second part may be 'y' MSBs of the application ID, where 'x+y' is the total number of bits in the application ID.

Figure 12A:
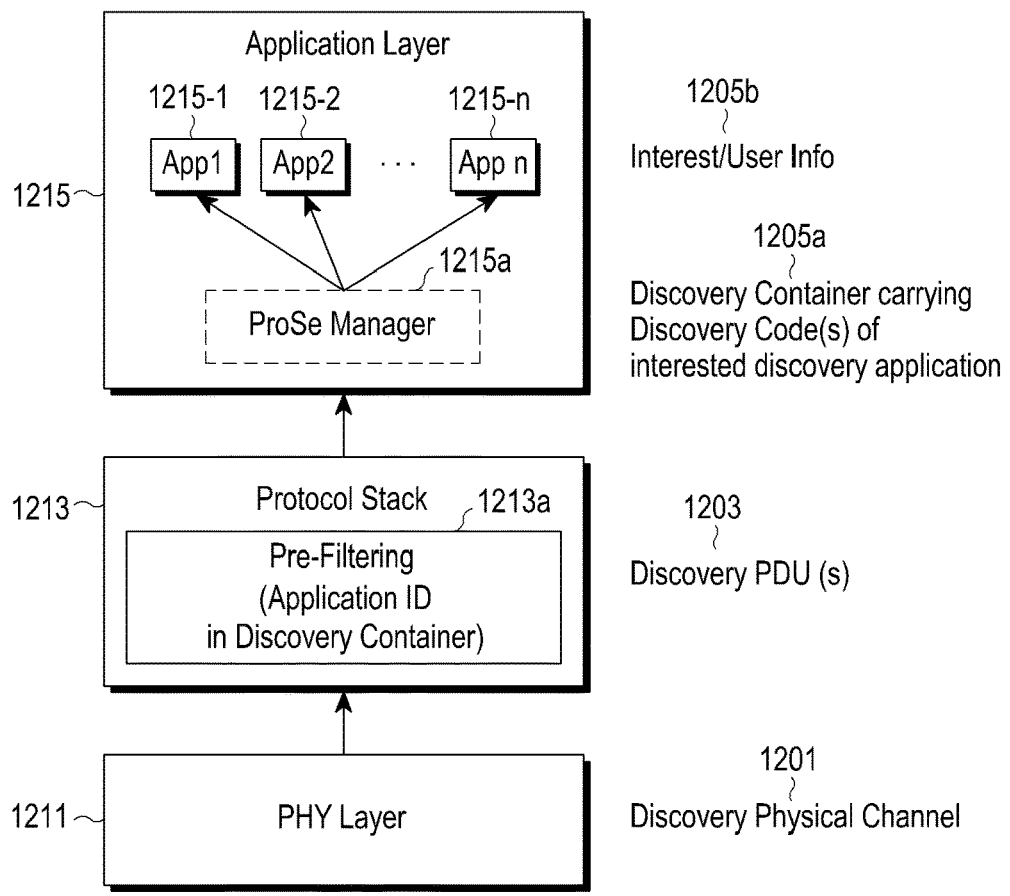
FIGS. 12A and 12B illustrate a method of performing pre-filtering using an application ID in a wireless communication system according to various embodiments of the present disclosure.
Figure 12B:
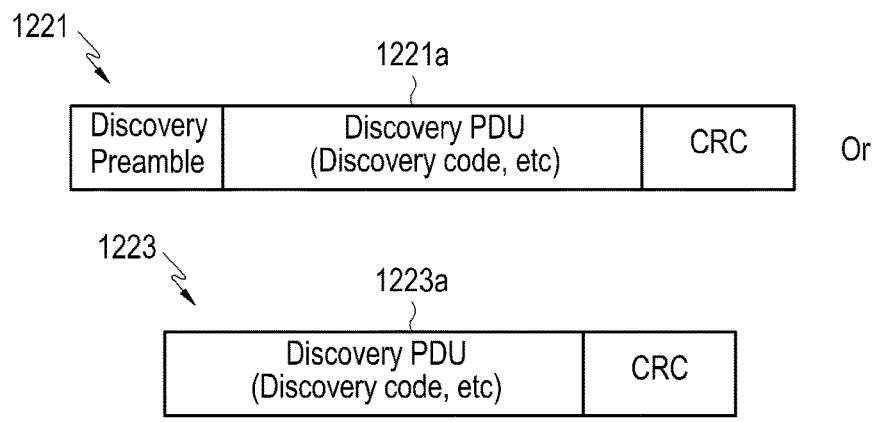

FIGS. 12A and 12B illustrate a method of performing pre-filtering using an application ID in a wireless communication system according to various embodiments of the present disclosure.

Referring to FIG. 12A, discovery information may be transmitted on a discovery physical channel 1201 by a ProSe UE (which supports a ProSe service or a D2D service, like discovery or communication). The application ID may be used to pre-filter the discovery information transmitted on the discovery physical channel 1201.

Referring to FIG. 12B, reference numeral 1221 or 1223 represents an example of a configuration of a PHY PDU carrying a discovery PDU. The application ID may be encoded in the discovery PDU 1221*a* or 1223*a*. The application ID may be encoded in the discovery PDU header, or in the discovery container in the discovery PDU. In the transmitting UE, the higher layer (e.g., an application layer or a D2D protocol layer or entity) may encode the application ID in the discovery container. In an embodiment, the application layer may send the application ID to the protocol stack. The protocol stack may encode the application ID in the discovery PDU header.

Referring to FIG. 12A, in the monitoring UE, an application layer 1215 may send the application ID to be monitored, to a protocol stack 1213. The protocol stack 1213 may receive discovery PDUs 1203 from a physical layer 1211 after decoding the PHY PDUs 1221 or 1223 received on the discovery physical channel 1201. The received discovery PDUs 1203 may then be processed by the protocol stack 1213. The protocol stack 1213 may check the application ID of its interest in the discovery PDU header or the discovery container in the discovery PDU, to pre-filter the discovery information 1213a. If the application ID of its interest is found in the protocol stack 1213, then only further processing (e.g., security verification, decoding, etc.) of the discovery container may be performed and the discovery container inside the discovery PDU 1203 may be sent to the application layer 1215. Therefore, the applications 1215-1, 1215-2, . . . , 1215-n in the application layer 1215 or the ProSe manager 1215a may determine that the pre-filtered discovery code/information in a discovery container 1205a corresponds to its interest/user information 1205b.

It is to be noted that application ID pre-filtering using only the discovery preamble or discovery resource categorization is not considered because of a large number of application IDs. However, if the application ID is large in size, then in an embodiment, the application type may be encoded in the discovery preamble and the application ID per application type may be encoded in the CRC mask.

Pre-filtering Using Discovery Category

Various embodiments of pre-filtering discovery information using a discovery category will now be described with reference to FIGS. 13A to 16B.

Figure 13A:
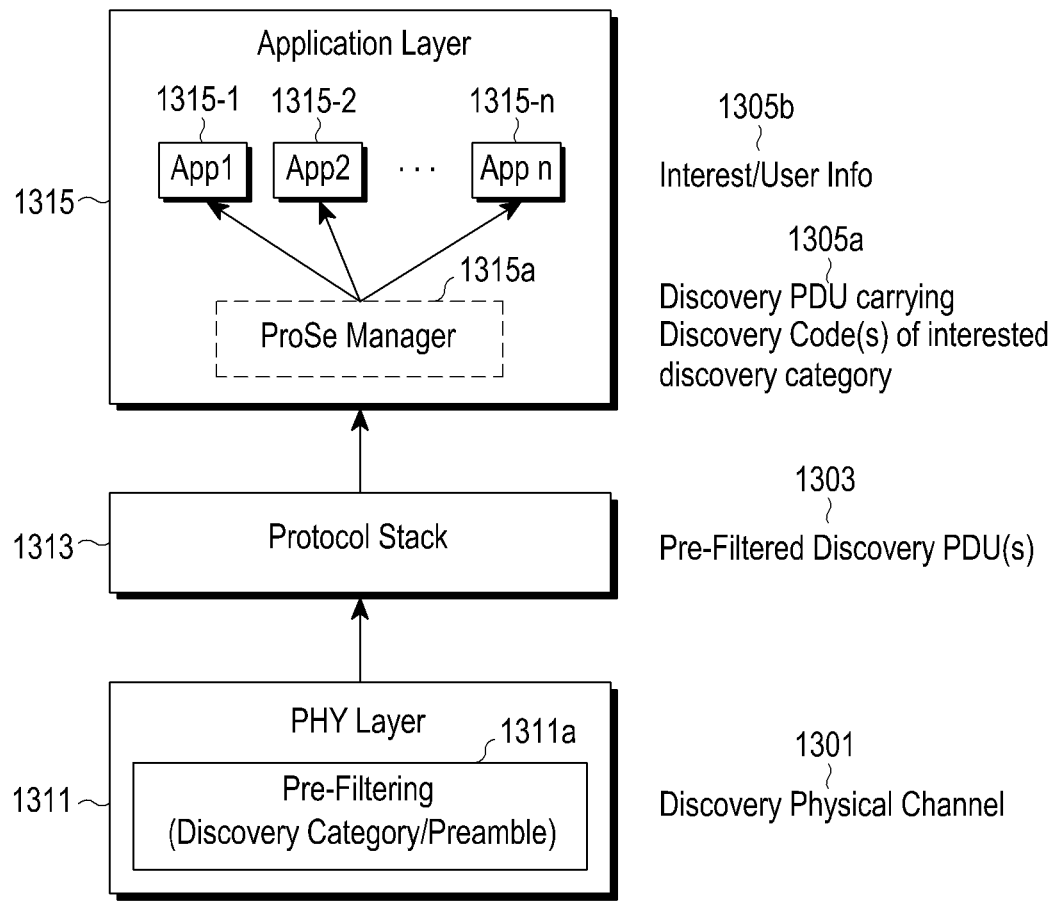
FIGS. 13A and 13B illustrate a method of performing pre-filtering using a discovery category in a wireless communication system according to various embodiments of the present disclosure.
Figure 13B:
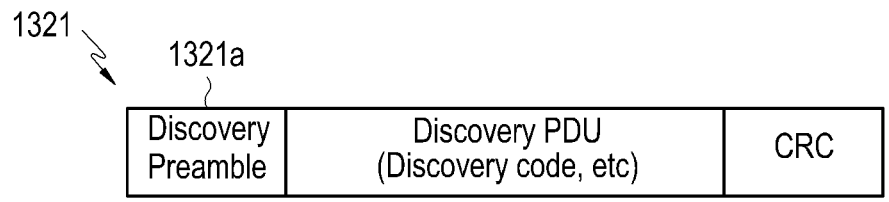

FIGS. 13A and 13B illustrate a method of performing pre-filtering using a discovery category in a wireless communication system according to various embodiments of the present disclosure.

Referring to FIG. 13A, discovery information may be transmitted on a discovery physical channel 1301 by a ProSe UE (which supports a ProSe service or a D2D service, like discovery or communication). The discovery category may be used to pre-filter the discovery information transmitted on the discovery physical channel 1301.

In this embodiment, a set of discovery preambles may be reserved, and each preamble may correspond to predefined discovery information category. In FIG. 13B, reference numeral 1321 represents an example of a configuration of a PHY PDU carrying a discovery PDU.

Referring to FIG. 13B, a discovery preamble 1321a may precede the discovery PDU on the discovery physical channel 1301. In the transmitting UE, the PHY layer may transmit the discovery preamble corresponding to the discovery information category transmitted on the discovery channel.

In the transmitting UE, the higher layer (e.g., an application layer or a D2D protocol layer or entity) may send the discovery information and its category to the protocol stack. The discovery category may be statically configured at the application layer for each application, or the application layer may receive the discovery category when the application layer receives a discovery code from a ProSe server (or ProSe manager). The protocol stack may send the discovery PDU carrying information to the PHY layer along with the type of preamble to be used for this discovery PDU carrying discovery information. The protocol stack may maintain the mapping between discovery information category and the discovery preamble. The PHY layer may transmit the indicated discovery preamble and the discovery PDU on the discovery channel.

Referring to FIG. 13A, in the monitoring UE, an application layer 1315 may send the discovery information and its category to a protocol stack 1313. The protocol stack 1313 may configure the discovery preambles to be monitored in a PHY layer 1311. The PHY layer 1311 in the monitoring UE may check the preamble corresponding to its interested discovery information to pre-filter the discovery information 1311a. The PHY layer 1311 may decode the discovery channel information if the preamble corresponds to its interested discovery information. The PHY layer 1311 may then send the discovery PDU to the protocol stack 1313 if the decoding is successful. The pre-filtered discovery PDUs 1303 may then be processed by the protocol stack 1313, and the discovery container inside the discovery PDU may be sent to the application layer 1315. Therefore, the applications 1315-1, 1315-2, . . . , 1315-n in the application layer 1315 or the ProSe manager 1315a may determine that the pre-filtered discovery code/information in a discovery PDU 1305a corresponds to its interest/user information 1305b.

In an embodiment, the discovery category may be encoded in the discovery preamble by generating a preamble mask specific to the discovery category.

Figure 14A:
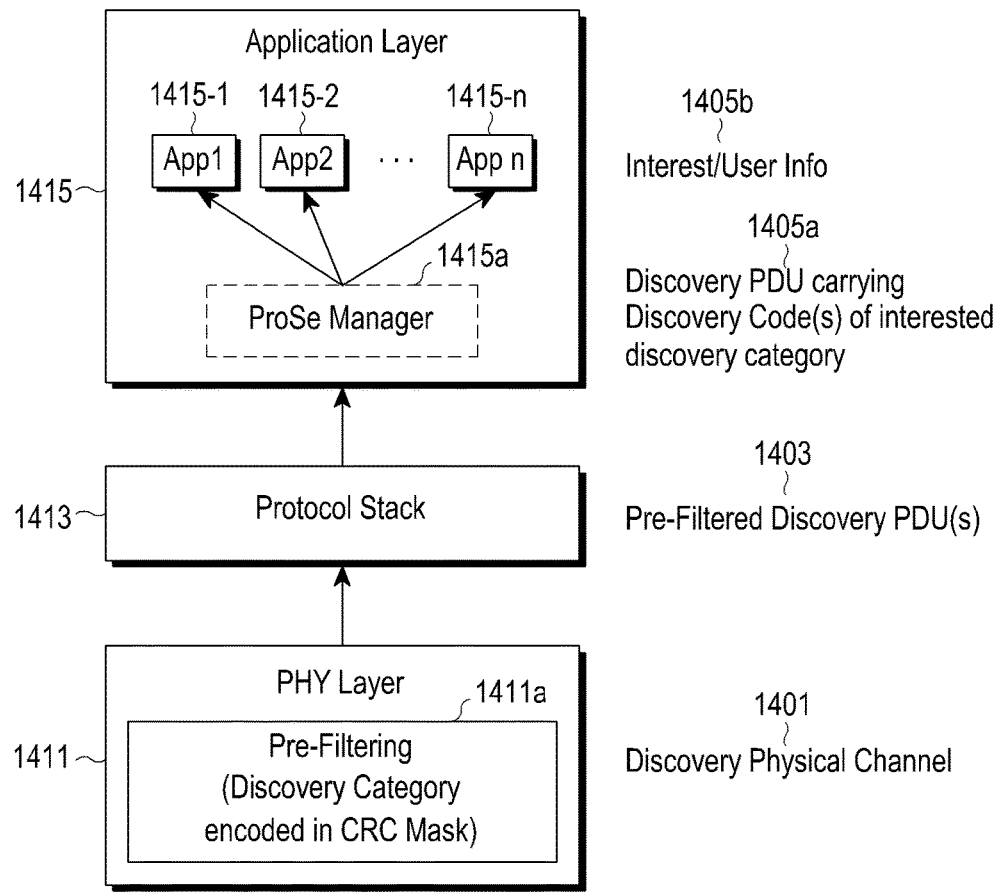
FIGS. 14A and 14B illustrate a method of performing pre-filtering using a discovery category in a wireless communication system according to various embodiments of the present disclosure.
Figure 14B:
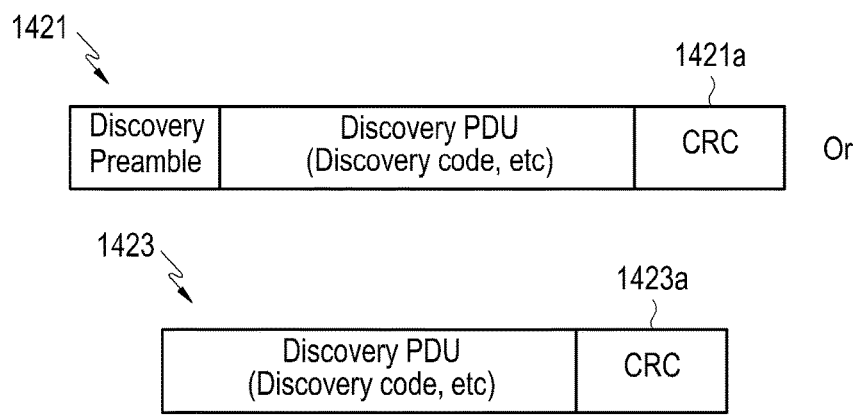

FIGS. 14A and 14B illustrate a method of performing pre-filtering using a discovery category in a wireless communication system according to various embodiments of the present disclosure.

Referring to FIG. 14A, discovery information may be transmitted on a discovery physical channel 1401 by a ProSe UE (which supports a ProSe service or a D2D service, like discovery or communication). The discovery category may be used to pre-filter the discovery information transmitted on the discovery physical channel 1401. In FIG. 14B, reference numeral 1421 or 1423 represents an example of a configuration of a PHY PDU carrying the discovery PDU.

Referring to FIG. 14B, the discovery category may be encoded in the CRC 1421a or 1423a of the discovery PDU. The discovery category may be encoded in the CRC 1421a or 1423a by generating a CRC mask corresponding to the discovery category. The generated CRC mask may then be used to generate the CRC of the discovery PDU. The CRC may then be added to the discovery PDU by the PHY layer 1411. In an embodiment, the CRC may be generated and added by the MAC layer, the RRC layer, the PDCP layer or any other layer.

In the transmitting UE, the higher layer (e.g., an application layer or a D2D protocol layer or entity) may send the discovery category to be encoded in the CRC, to the protocol stack. The protocol stack may configure the discovery category to be encoded in the CRC in the PHY layer. In an embodiment, the protocol stack may send the discovery category to be encoded in the CRC along with the discovery PDU to be transmitted on the discovery channel. The PHY layer may encode the discovery category in the CRC, and transmit the discovery PDU on the discovery channel.

Referring to FIG. 14A, in the monitoring UE, an application layer 1415 may send the discovery category to be monitored in the CRC, to a protocol stack 1413. The protocol stack 1413 may configure the discovery category to be monitored in the CRC in a PHY layer 1411. The PHY layer 1411 in the monitoring UE may check the CRC corresponding to its interested discovery category to pre-filter the discovery information 1411a. If the CRC is passed, the PHY layer 1411 may send the discovery PDU to the protocol stack 1413. Otherwise, the PHY layer 1411 may discard the received discovery information. The pre-filtered discovery PDUs 1403 may then be processed by the protocol stack 1413, and the discovery container inside the discovery PDU may be sent to the application layer 1415. Therefore, the applications 1415-1, 1415-2, . . . , 1415-*n* in the application layer 1415 or the ProSe manager 1415*a* may determine that the pre-filtered discovery code/information in a discovery PDU 1405*a* corresponds to its interest/user information 1405*b*.

The discovery category may be statically configured at the application layer 1415 for each application, or the application layer 1415 may receive the discovery category when the application layer 1415 receives the discovery code from the ProSe manager 1415*a*.

Figure 15:
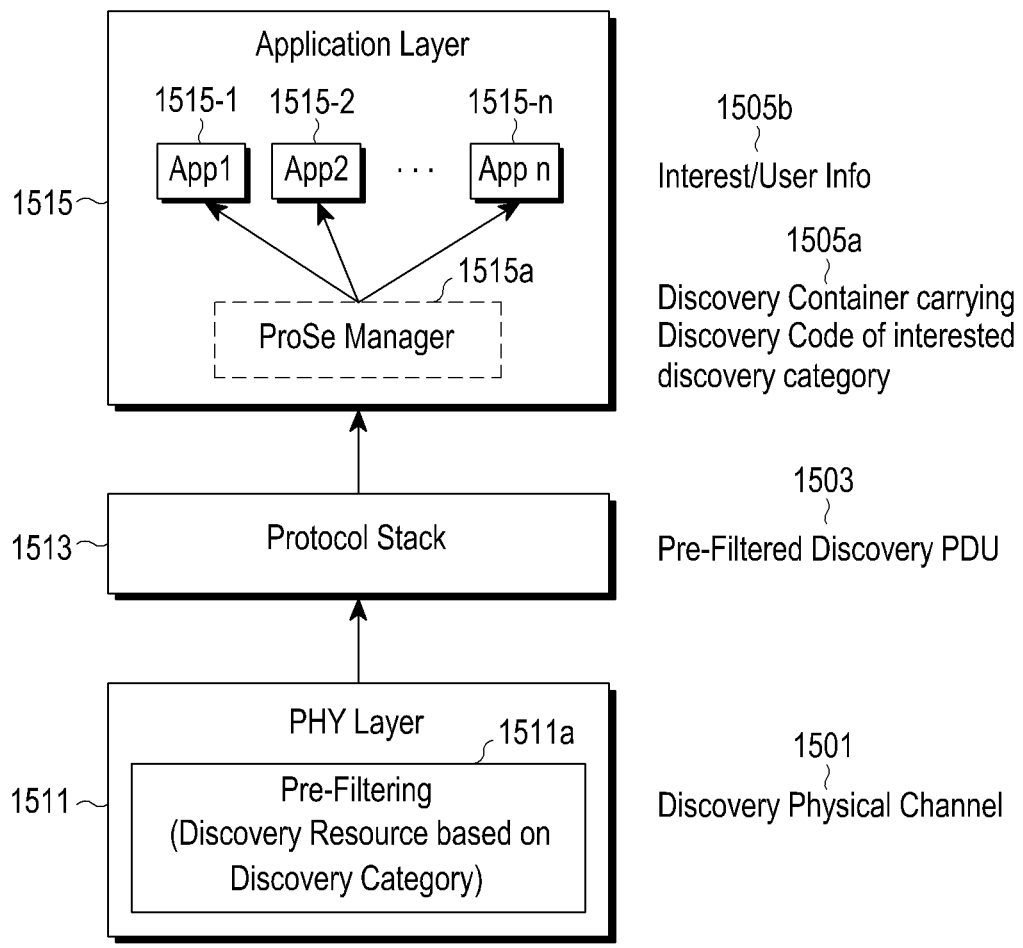
FIG. 15 illustrates a method of performing pre-filtering using a discovery category in a wireless communication system according to an embodiment of the present disclosure.

FIG. 15 illustrates a method of performing pre-filtering using a discovery category in a wireless communication system according to an embodiment of the present disclosure.

Referring to FIG. 15, discovery information may be transmitted on a discovery physical channel 1501 by a ProSe UE (which supports a ProSe service or a D2D service, like discovery or communication). The discovery category may be used to pre-filter the discovery information transmitted on the discovery physical channel 1501. In this proposed pre-filtering method, different discovery resources may be reserved or allocated for different category of discovery information. In the transmitting UE, the application layer may send the discovery information and its category to the protocol stack. In an embodiment, the protocol stack may be the protocol stack that includes various layers such as RRC layer, PDCP layer, RLC layer, MAC layer, etc. The protocol stack may send the discovery information to the PHY layer along with the type of resources to be used for this discovery information. The protocol stack may maintain the mapping between discovery information category and discovery resources. The PHY layer may transmit the discovery PDU on the discovery channel on the indicated discovery resources.

Referring to FIG. 15, in the monitoring UE, an application layer 1515 may send the discovery information and its category to a protocol stack 1513. The protocol stack 1513 may configure the discovery resources to be monitored in a PHY layer 1511. The PHY layer 1511 in the monitoring UE may look for the discovery physical channel 1501 in the discovery resources corresponding to the discovery category of its interested discovery information to pre-filter the discovery information 1511*a*. The pre-filtered discovery PDU 1503 received on the monitored discovery resources may then be processed by the protocol stack 1513. The discovery container inside the discovery PDU may be sent to the application layer 1515. Therefore, the applications 1515-1, 1515-2, . . . , 1515-*n* in the application layer 1515 or the ProSe manager 1515*a* may determine that the pre-filtered discovery code/information in a discovery container 1505*a* corresponds to its interest/user information 1505*b*.

The discovery resource for a specific category of the discovery information may be signaled using a PDCCH which is a downlink control channel, or an SIB which is broadcasted system information. In an embodiment, a different C-RNTI or indicator in a PDCCH or SIB may indicate the discovery category. A different discovery SF may be for a different discovery category. In a discovery SF, a discovery channel may be assigned for a different type of discovery dynamically or semi-statically.

Figure 16A:
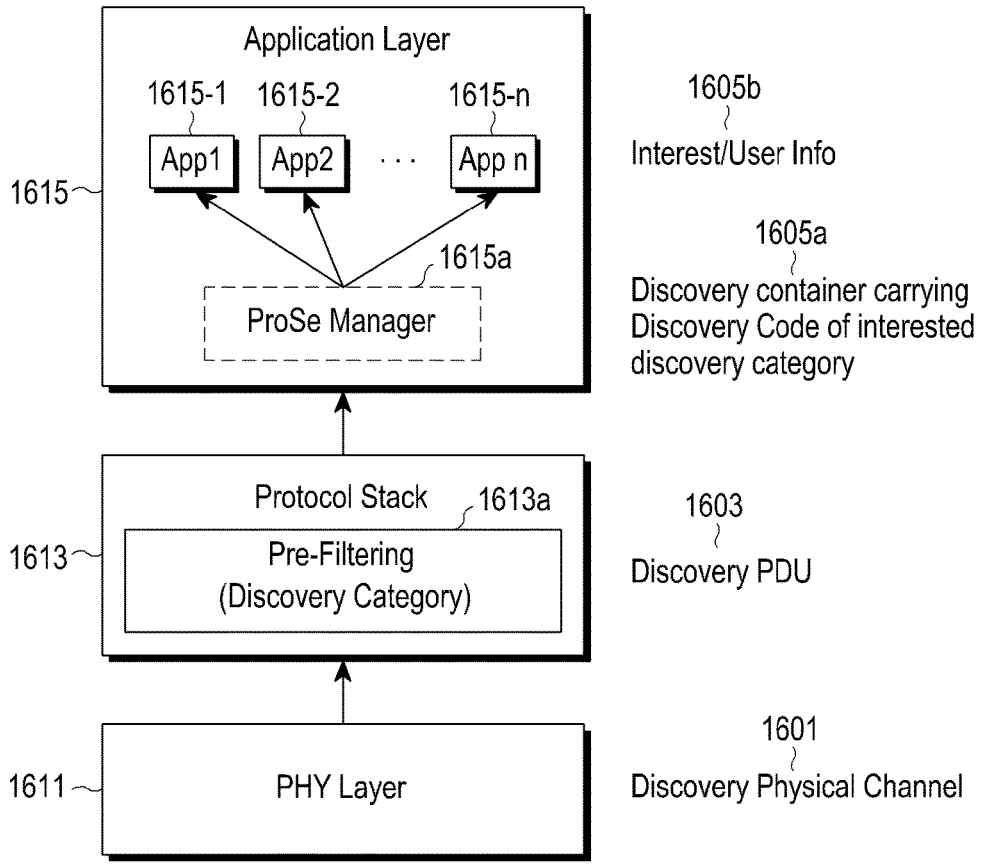
FIGS. 16A and 16B illustrate a method of performing pre-filtering using a discovery category in a wireless communication system according to various embodiments of the present disclosure.
Figure 16B:
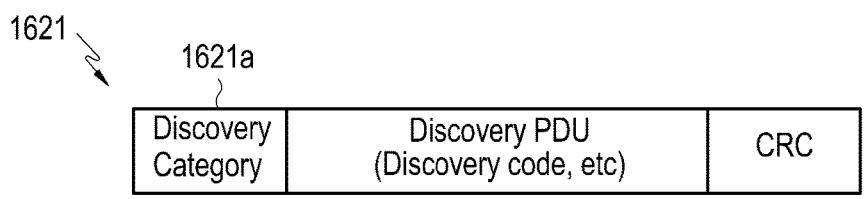

FIGS. 16A and 16B illustrate a method of performing pre-filtering using a discovery category in a wireless communication system according to an embodiment of the present disclosure.

In this embodiment, the discovery category may be encoded in the discovery PDU. The discovery category may be encoded in discovery PDU header, or in the discovery container in the discovery PDU. In the transmitting UE, the higher layer (e.g., an application layer or a D2D protocol layer or entity) may encode the discovery category in the discovery container. In an embodiment, the application layer may send the discovery category to the protocol stack. The protocol stack may encode the discovery category in the discovery PDU header.

Referring to FIG. 16A, in the monitoring UE, an application layer 1615 may send the discovery category to be monitored, to a protocol stack 1613.

Referring to FIG. 16B, reference numeral 1621 represents an example of a configuration of a PHY PDU carrying a discovery PDU. The protocol stack 1613 may receive the discovery PDUs 1603 from a PHY layer 1611 after decoding the PHY PDUs 1621 received on a discovery physical channel 1601. The received discovery PDUs 1603 may then be processed by the protocol stack 1613. The protocol stack 1613 may check the discovery category 1621*a* (see FIG. 16B) of its interest in the discovery PDU header or the discovery container in the discovery PDU, to pre-filter the discovery information 1613*a*. If the discovery category of its interest is found, then only further processing (e.g., security verification, decoding, etc.) of the discovery container may be performed, and the discovery container inside the discovery PDU may be sent to the application layer 1615. Therefore, the applications 1615-1, 1615-2, . . . , 1615-*n* in the application layer 1615 or the ProSe manager 1615*a* may determine that the pre-filtered discovery code/information in a discovery container 1605*a* corresponds to its interest/user information 1605*b*.

The discovery category may be statically configured at the application layer 1615 for each of the applications 1615-1, 1615-2, . . . , 1615-*n*, or the application layer 1615 may receive the discovery category when the application layer 1615 receives the discovery code from the ProSe manager 1615*a*.

Pre-Filtering Using Application ID & Discovery Category

Various embodiments of pre-filtering discovery information using two parameters, i.e., an application ID and a discovery category, will be described below with reference to FIGS. 17A to 19B.

Figure 17A:
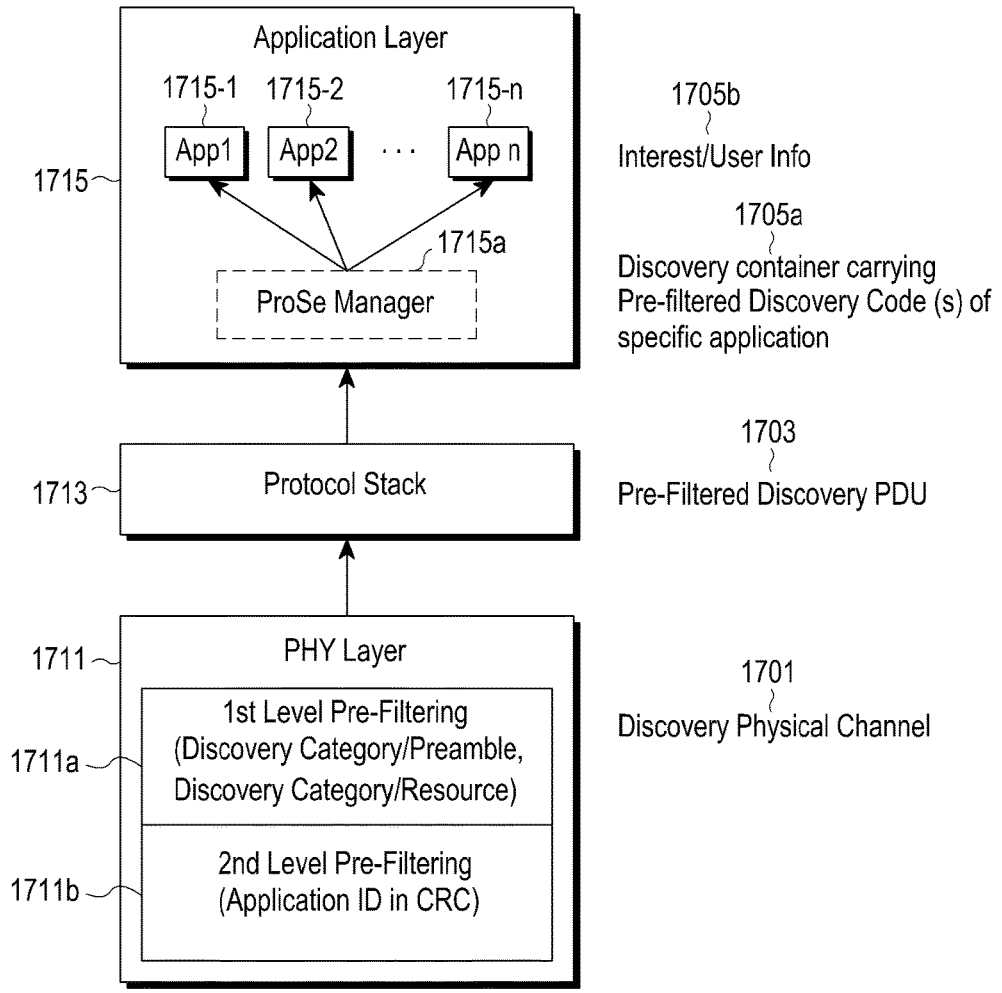
FIGS. 17A and 17B illustrate a method of performing pre-filtering using an application ID and a discovery category in a wireless communication system according to various embodiments of the present disclosure.
Figure 17B:
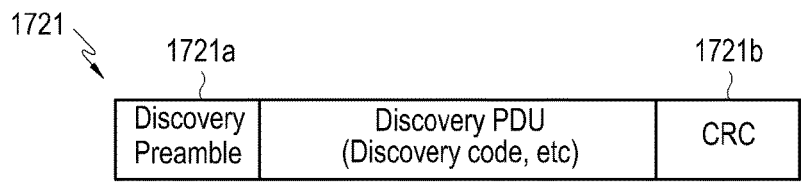

FIGS. 17A and 17B illustrate a method of performing pre-filtering using an application ID and a discovery category in a wireless communication system according to various embodiments of the present disclosure.

Referring to FIG. 17A, discovery information may be transmitted on a discovery physical channel 1701 by a ProSe UE (which supports a ProSe service or a D2D service, like discovery or communication). In this embodiment, a set of discovery preambles may be reserved, and each preamble corresponds to a predefined discovery category.

Referring to FIG. 17B, reference numeral 1721 represents an example of a configuration of a PHY PDU carrying a discovery PDU. A discovery preamble 1721*a* may precede the discovery PDU on the discovery physical channel 1701. In the transmitting UE, the PHY layer 1711 may transmit the discovery preamble corresponding to the discovery category transmitted on the discovery physical channel 1701.

Referring to FIG. 17B, the application ID may be encoded in a CRC 1721*b* of the discovery PDU. The application ID may be encoded in the CRC 1721*b* by generating a CRC mask corresponding to the application ID. The generated CRC mask may then be used to generate the CRC of the discovery PDU. The CRC may then be added to the discovery PDU by the PHY layer 1711. In an embodiment, the CRC may be generated and added by the MAC layer, the RRC layer, the PDCP layer or any other layer.

In the transmitting UE, the higher layer (e.g., an application layer or a D2D protocol layer or entity) may send the discovery information, application ID and discovery category to the protocol stack. The protocol stack may configure the application ID to be encoded in the CRC in the PHY layer. In an embodiment, the protocol stack may send the application ID to be encoded in the CRC along with the discovery PDU to be transmitted on the discovery channel. The protocol stack may also send the discovery PDU carrying information to the PHY layer along with the type of preamble to be used for this discovery PDU carrying discovery information. The protocol stack may maintain the mapping between discovery information category and discovery preamble. The PHY layer may encode the application ID in the CRC. The PHY layer may then transmit the indicated discovery preamble and the discovery PDU on the discovery channel.

Referring to FIG. 17A, in the monitoring UE, an application layer 1715 may send the application ID and discovery category to be monitored, to a protocol stack 1713. The protocol stack 1713 may configure the application ID to be monitored in the CRC in a PHY layer 1711. The protocol stack 1713 may also configure the discovery preambles to be monitored in the PHY layer 1711. The PHY layer 1711 in the monitoring UE may check the preamble corresponding to the discovery category of its interested discovery information, to primarily filter the discovery information 1711*a*. The PHY layer 1711 may decode the discovery channel information if the preamble corresponds to the discovery category of its interested discovery information. During the decoding, the PHY layer 1711 in the monitoring UE may check the CRC corresponding to its interested application ID, to secondarily filter the discovery information 1711*b*. If the CRC is passed, the PHY layer 1711 may send the discovery PDU to the protocol stack 1713. Otherwise, the PHY layer 1711 may discard the received discovery information. The pre-filtered discovery PDUs 1703 may then be processed by the protocol stack 1713, and the discovery container inside the discovery PDU may be sent to the application layer 1715. Therefore, the applications 1715-1, 1715-2, . . . , 1715-*n* in the application layer 1715 or the ProSe manager 1715*a* may determine that the pre-filtered discovery code/information in a discovery container 1705*a* corresponds to its interest/user information 1705*b*.

It is to be noted that in an embodiment, discovery resource may be categorized based on the discovery category. In this case, the discovery category may be pre-filtered not using the discovery preamble, but using the discovery resource categorization.

Figure 18A:
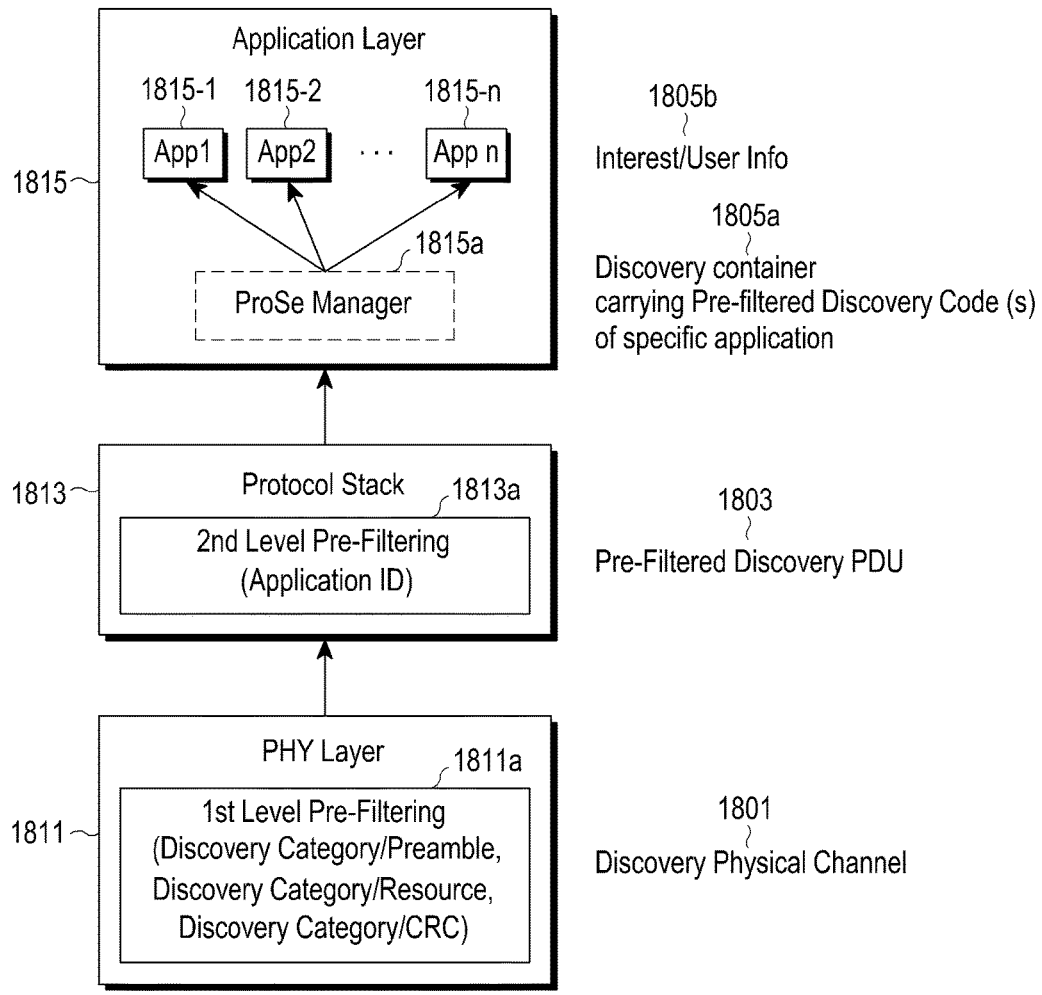
FIGS. 18A and 18B illustrate a method of performing pre-filtering using an application ID and a discovery category in a wireless communication system according to various embodiments of the present disclosure.
Figure 18B:
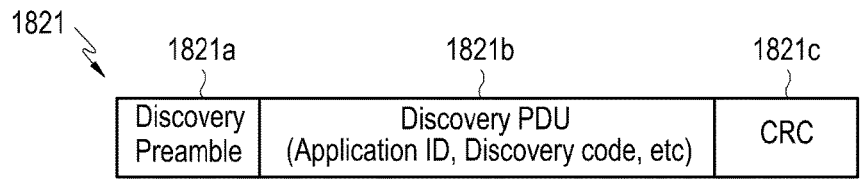

FIGS. 18A and 18B illustrate a method of performing pre-filtering using an application ID and a discovery category in a wireless communication system according to various embodiments of the present disclosure.

Referring to FIG. 18A, discovery information may be transmitted on a discovery physical channel 1801 by a ProSe UE (which supports a ProSe service or a D2D service, like discovery or communication). In an embodiment, the discovery category may be pre-filtered using the discovery preamble, the discovery CRC, or the discovery resource categorization in accordance with the procedure described in FIGS. 17A and 17B.

Referring to FIG. 18B, reference numeral 1821 represents an example of a configuration of a PHY PDU carrying the discovery PDU. Referring to FIG. 18B, the primary pre-filtering may be based on a preamble 1821*a*, the discovery resource, or a CRC 1821*c* specific to the discovery category. The secondary pre-filtering may be performed based on an application ID 1821*b* encoded in the discovery PDU. This secondary pre-filtering may be applied when the discovery PDU is processed by the protocol stack 1813.

In the transmitting UE, the higher layer (e.g., an application layer or a D2D protocol layer or entity) may send the discovery information and discovery category to the protocol stack. The application layer may encode the application ID in the discovery information. Alternately, the application layer may send the application ID to protocol stack. In this case, the protocol stack may encode the application ID in the discovery PDU header. The protocol stack may then configure the PHY layer to encode the discovery category in the CRC or the discovery preamble, or may instruct the PHY layer to transmit a discovery channel in discovery resources specific to the discovery category. The PHY layer may then transmit the discovery PDU accordingly.

Referring to FIG. 18A, in the monitoring UE, an application layer 1815 may send the application ID and discovery category to be monitored, to a protocol stack 1813. The protocol stack 1813 may then configure the PHY layer 1811 to decode the discovery category in the CRC or the discovery preamble, or instruct a PHY layer 1811 to receive the discovery physical channel 1801 in the discovery resources specific to the discovery category. The PHY layer 1811 may receive the discovery physical channel 1801 in the discovery resources specific to the discovery category, to primarily pre-filter the discovery information 1811*a*. The discovery PDU received by the PHY layer 1811 may then be sent to the protocol stack 1813. The received discovery PDUs 1803 may then be processed by the protocol stack 1813. The protocol stack 1813 may check the application ID of its interest in the discovery PDU header, or in the discovery container in the discovery PDU, to secondarily pre-filter the discovery information 1813*a*.

If the application ID of its interest is found, then only further processing (e.g., security verification, decoding, etc.) of the discovery container may be performed, and the discovery container inside the discovery PDU may be sent to the application layer 1815. Therefore, the applications 1815-1, 1815-2, . . . , 1815-*n* in the application layer 1815 or the ProSe manager 1815*a* may determine that the pre-filtered discovery code/information in a discovery container 1805*a* corresponds to its interest/user information 1805*b*.

Figure 19A:
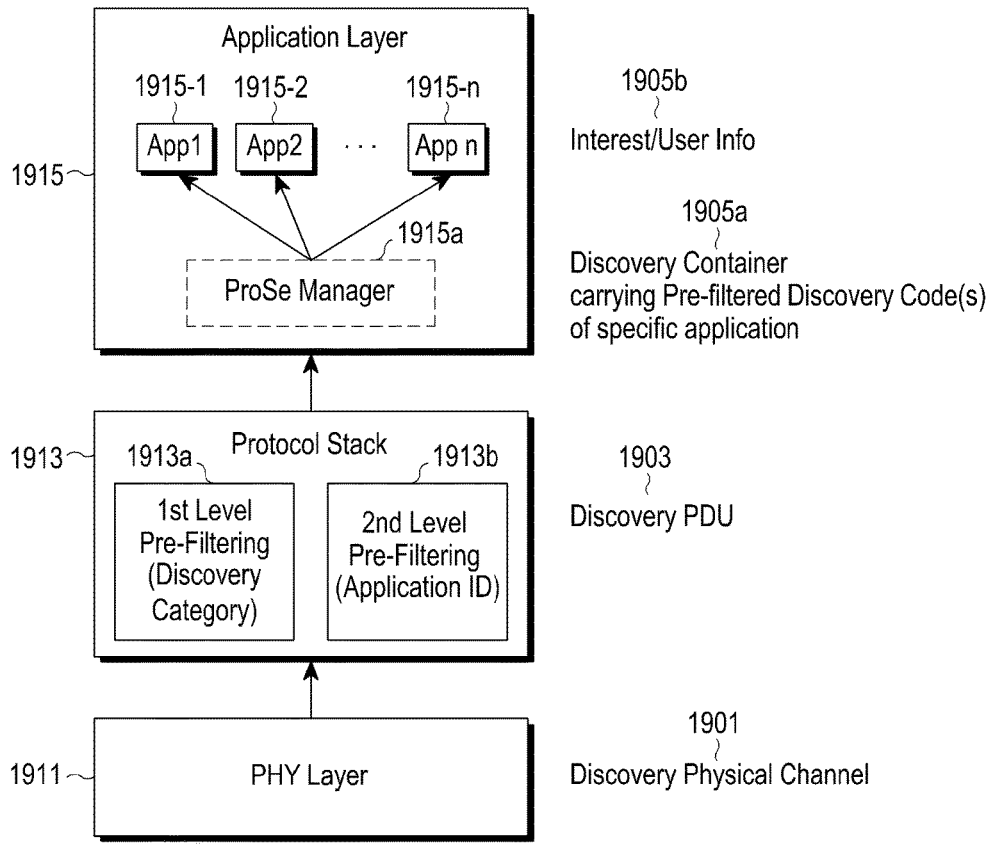
FIGS. 19A and 19B illustrate a method of performing pre-filtering using an application ID and a discovery category in a wireless communication system according to various embodiments of the present disclosure.
Figure 19B:
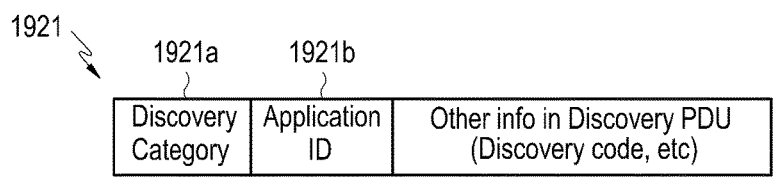

FIGS. 19A and 19B illustrate a method of performing pre-filtering using an application ID and a discovery category in a wireless communication system according to various embodiments of the present disclosure.

Referring to FIG. 19B, reference numeral 1921 represents an example of a configuration of a PHY PDU carrying a discovery PDU. Referring to FIG. 19B, an application ID 1921*b* and a discovery category 1921*a* may be encoded in the discovery PDU. The application ID 1921*b* and the discovery category 1921*a* may be encoded in the discovery PDU header, or in the discovery container in the discovery PDU. In the transmitting UE, the application layer may encode the application ID or/and the discovery container in the discovery container. In an embodiment, the application layer may send the application ID and the discovery category to the protocol stack. The protocol stack may encode the application ID and the discovery category in the discovery PDU header. Alternately, the discovery category may be encoded in the discovery PDU header, and the application ID may be encoded in the discovery container.

Referring to FIG. 19A, in the monitoring UE, an application layer 1915 may send the application ID and the discovery category to be monitored, to a protocol stack 1913. The protocol stack 1913 may receive the discovery PDUs 1903 from a PHY layer 1911 after decoding the PHY PDUs received on a discovery physical channel 1901. The received discovery PDUs 1903 may then be processed by the protocol stack 1913. The protocol stack 1913 may check the discovery category of its interest in the discovery PDU header, or in the discovery container in the discovery PDU, to primarily pre-filter the discovery information 1913a. If the discovery category of its interest is found, the protocol stack 1913 may then check the application ID of its interest in the discovery PDU header, or in the discovery container in the discovery PDU, to secondarily pre-filter the discovery information 1913b. If the application ID of its interest is found, only further processing (e.g., security verification, decoding, etc.) of the discovery container may be performed, and the discovery container inside the discovery PDU may be sent to the application layer 1915. Therefore, the applications 1915-1, 1915-2, . . . , 1915-n in the application layer 1915 or the ProSe manager 1915a may determine that the pre-filtered discovery code/information in a discovery container 1905a corresponds to its interest/user information 1905b.

In various embodiments, depending on the discovery category, different information may be encoded in the CRC. For example, if the discovery category is a group discovery, a ProSe group ID may be present in the group discovery. If the discovery category is a broadcast discovery, an application ID may be present in the broadcast discovery. If the discovery category is a unicast discovery, a ProSe UE ID may be present in the unicast discovery.

Discovery Information Flow

Figure 20:
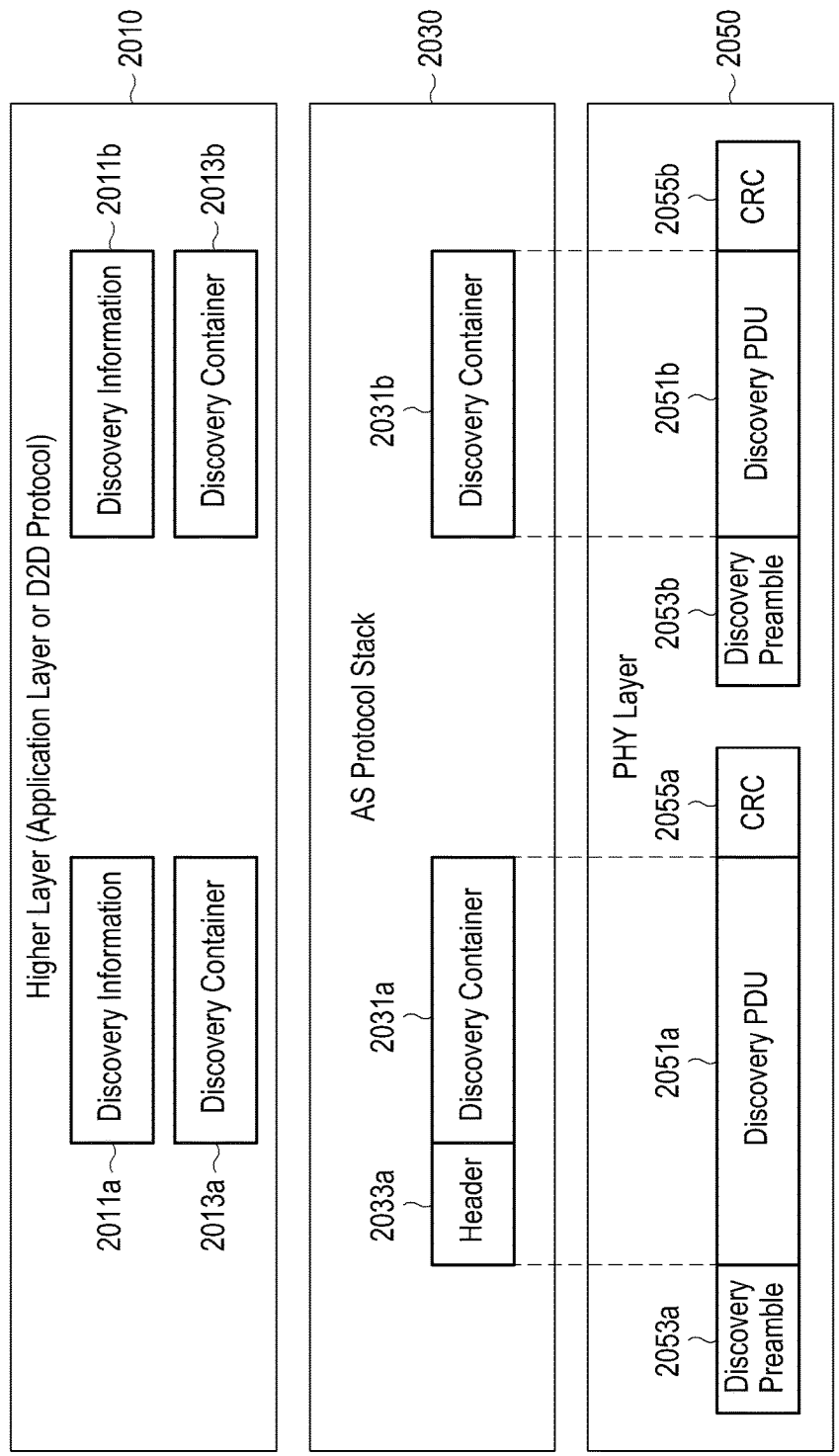
FIG. 20 illustrates a discovery information transmission flow according to an embodiment of the present disclosure.

FIG. 20 illustrates a discovery information transmission flow according to an embodiment of the present disclosure.

Referring to FIG. 20, a higher layer (e.g., an application layer or a D2D protocol) 2010 may provide discovery containers 2013a and 2013b carrying the discovery information 2011a and 2011b to an access stratum (AS) protocol stack (hereinafter, referred to as a 'protocol stack') 230. The higher layer 2010 may pack the discovery information 2011a and 2011b in the discovery containers 2013a and 2013b, and a protocol stack 2030 may provide a number of bytes that the higher layer 2010 can pack in the discovery containers 2013a and 2013b (which are the same as reference numerals 2031a and 2031b). The size of the discovery containers 2031a and 2031b may be dependent on the amount of information that can be transmitted on a discovery channel. The discovery containers 2031a and 2031b may carry the discovery information, and content of the discovery containers 2031a and 2031b may be transparent to the protocol stack 2030. The protocol stack 2030 may build the discovery PDUs 2051a and 2051b from the discovery containers 2031a and 2031b. Each of the discovery PDUs 2051a and 2051b may carry one or more discovery containers 2031a and 2031b. The discovery PDU 2051a may include a header 2033a. Alternately, no header may be added to the discovery PDU 2051b by the protocol stack 2030. The protocol stack 2030 may send the discovery PDUs 2051a and 2051b to a PHY layer 2050. The PHY layer 2050 may attach the CRCs 2055a and 2055b to the discovery PDUs 2051a and 2051b, and transmit the discovery PDUs 2051a and 2051b on the discovery channel. The PHY layer 2050 may send discovery preambles 2053a and 2053b before the discovery PDU transmission. The discovery preamble may assist the monitoring UE in timing. If the discovery preamble is present, then monitoring UE does not need to be perfectly timing-synchronized with the transmitting UE. The discovery preamble may also assist the monitoring UE in automatic gain control (AGC) measurement and adjustment. The discovery preamble may also assist the pre-filtering as described earlier. The discovery preambles may also indicate the size of a discovery PDU. The discovery preamble may be transmitted before every discovery PDU. In alternate method, the discovery preamble may be transmitted only at a specified time interval. For example, it may be transmitted in a fixed subframe of every discovery period. The fixed subframe can be the first subframe. It is to be noted that CRCs 2055a and 2055b may be attached by the protocol stack 2030 instead of the PHY layer 2050. In an embodiment, the protocol stack may be the 3GPP protocol stack that includes various layers such as RRC layer, PDCP layer, RLC layer, MAC layer, etc.

Figure 21:
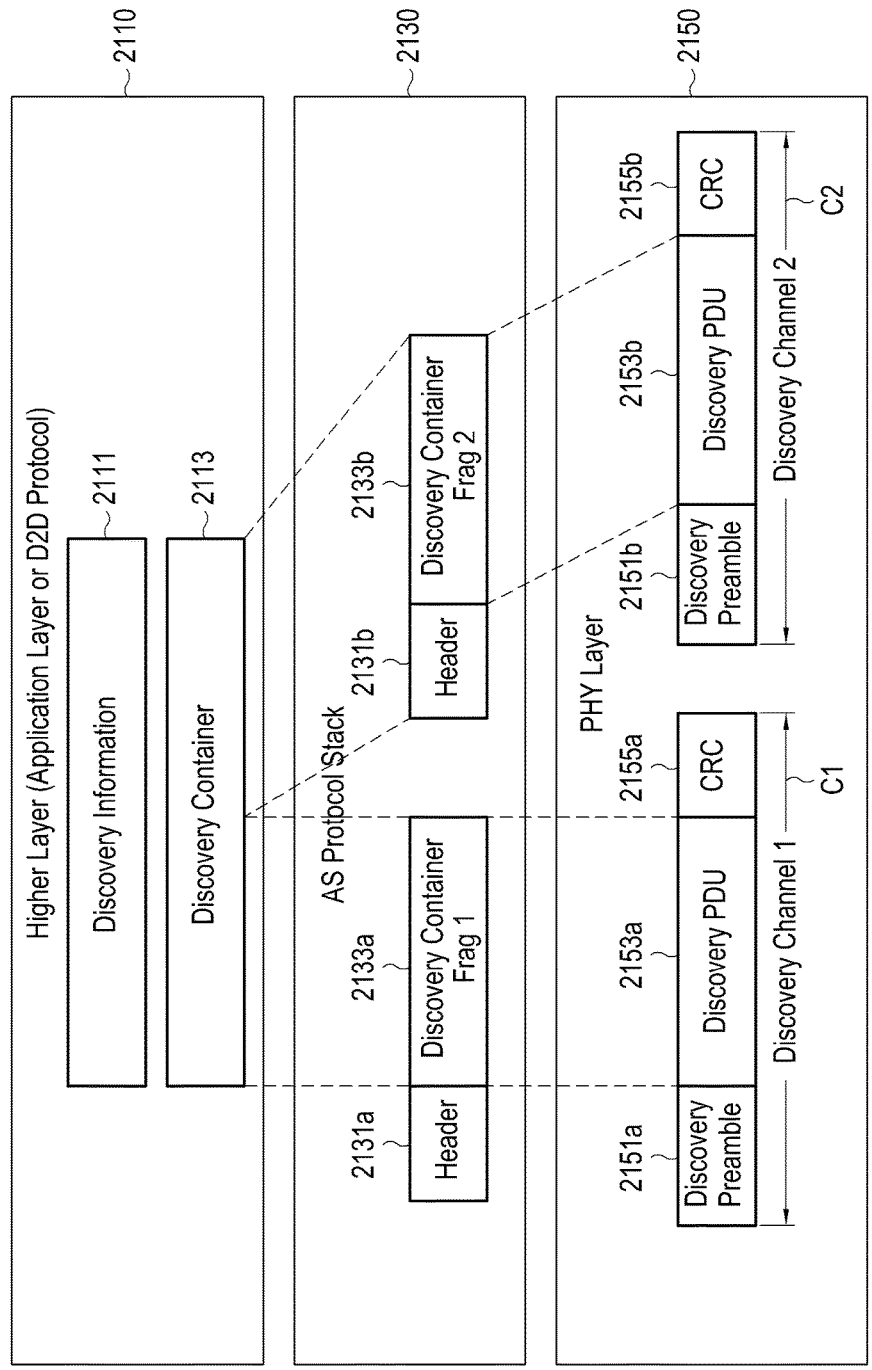
FIG. 21 illustrates a discovery information transmission flow according to an embodiment of the present disclosure.

FIG. 21 illustrates a discovery information transmission flow according to an embodiment of the present disclosure.

Referring to FIG. 21, a higher layer 2110 may pack the discovery information 2111 in a discovery container 2113, and send the discovery container 2113 to a protocol stack 2130. The discovery information 2111 to be transmitted may be larger in size than the information that can be carried on the discovery channel. The protocol stack 2130 may fragment the discovery container 2113, if the discovery container 2113 cannot be carried on a single discovery channel because of its large size. In this case, as illustrated in FIG. 21, the protocol stack 2130 may fragment the discovery container 2113 into a plurality of fragments 2133a and 2133b, and transmit the fragmented discovery container fragments 2133a and 2133b on independent discovery channels C1 and C2 in a PHY layer 2150, respectively. It is to be noted that the protocol stack 2130 may or may not add headers 2131a and 2131b in the discovery PDU. The PHY PDUs transmitted in the PHY layer 2150 may include discovery PDUs 2153a and 2153b including the fragmented discovery container fragments 2133a and 2133b; and discovery preambles 2151a and 2151b and CRCs 2155a and 2155b, which are for pre-filtering in the aforementioned embodiments. The discovery preambles 2151a and 2151b may be selectively included. The discovery preamble may be transmitted before every discovery PDU. In alternate method, the discovery preamble may be transmitted only at a specified time interval. For example, it may be transmitted in a fixed subframe of every discovery period. The fixed subframe can be the first subframe. It is to be noted that if the discovery container 2113 is not fragmented, the discovery information flow may be the same as that illustrated in FIG. 20.

Figure 22:
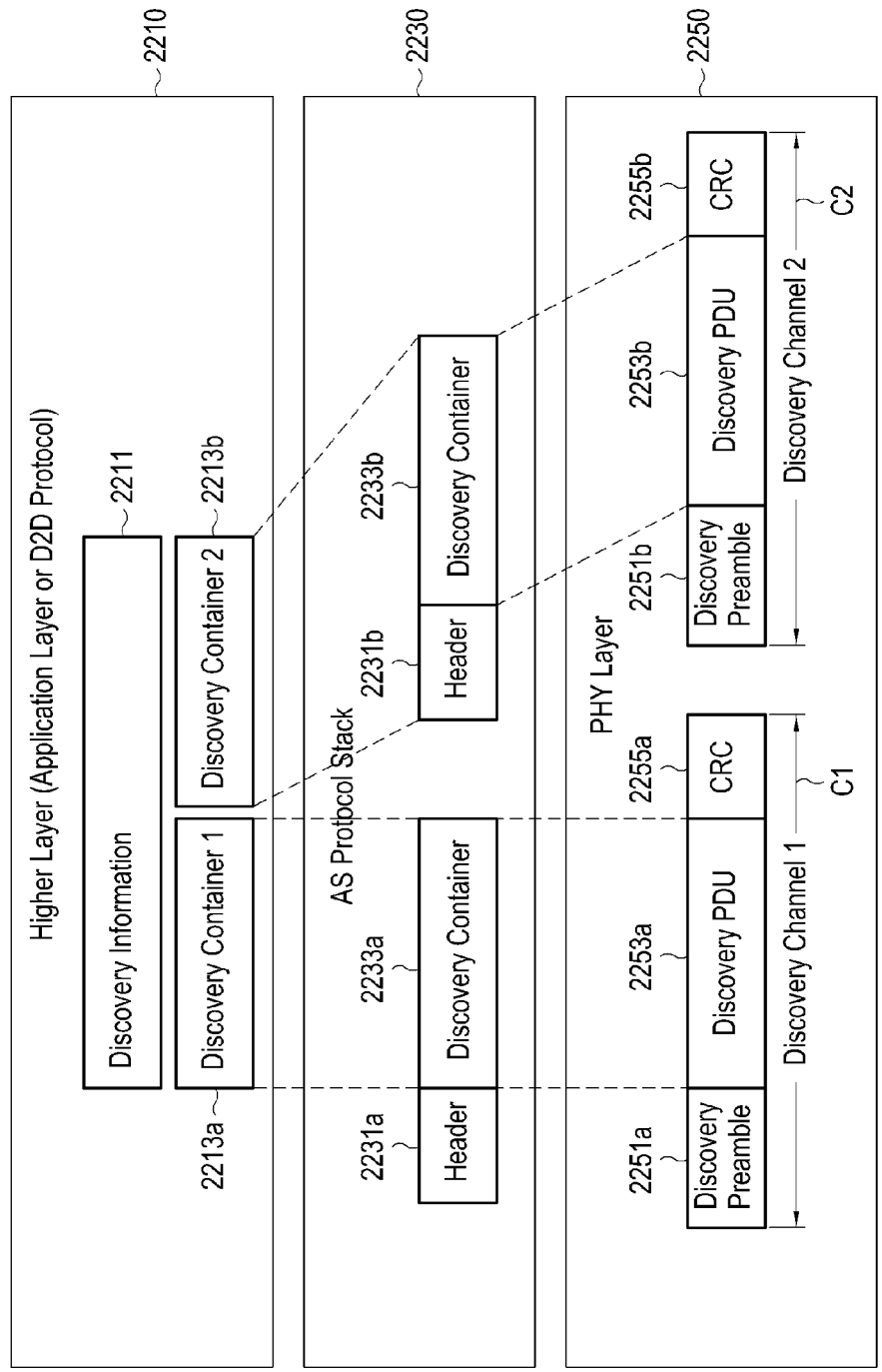
FIG. 22 illustrates a discovery information transmission flow according to an embodiment of the present disclosure.

FIG. 22 illustrates a discovery information transmission flow according to an embodiment of the present disclosure.

Referring to FIG. 22, a higher layer 2210 may pack the discovery information 2211 in discovery containers 2213a and 2213b. A protocol stack 2230 may provide a number of bytes that the higher layer 2210 can pack, for example, in one discovery container. The size of the discovery container may be dependent on the amount of information that can be transmitted on a discovery channel. The discovery container may carry the discovery information, and content of the discovery container may be transparent to the protocol stack 2230. As in the example of FIG. 22, if the discovery information 2211 to be transmitted is larger in size than a discovery container, then the higher layer 2210 may fragment the discovery information 2211 into multiple discovery containers 2213a and 2213b, and send them to the protocol stack 2230. The protocol stack 2230 may build the discovery PDU from each of the discovery containers 2233a and 2233b. The protocol stack 2230 may optionally add headers 2231a and 2231b in the discovery PDU. The protocol stack 2230 may send the discovery PDU to a PHY layer 2250. The PHY layer 2250 may attach the CRCs 2255a and 2255b to discovery PDUs 2253a and 2253b, and transmit the discovery PDUs 2253a and 2253b on the independent discovery channels C1 and C2, respectively. The PHY layer 2250 may send discovery preambles 2251a and 2251b before the discovery PDU transmission. The discovery preamble may be transmitted before every discovery PDU. In alternate method, the discovery preamble may be transmitted only at a specified time interval. For example, it may be transmitted in a fixed subframe of every discovery period. The fixed subframe can be the first subframe. Alternatively, the CRC may be attached by the protocol stack 2230 instead of the PHY layer 2250. In an embodiment, the protocol stack 2230 may be the 3GPP protocol stack that includes various layers such as RRC layer, PDCP layer, RLC layer, MAC layer, etc.

Protocol Stack Architecture for Discovery PDU

Figure 23A:
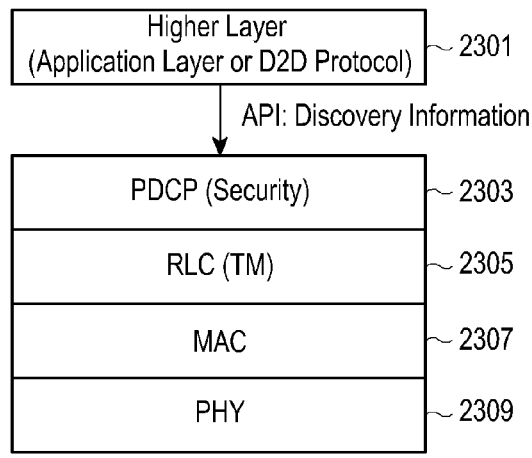
FIG. 23A illustrates protocol stack architecture for a discovery PDU according to an embodiment of the present disclosure.

Security in Protocol Stack:

FIG. 23A illustrates protocol stack architecture for a discovery PDU according to an embodiment of the present disclosure.

Referring to FIG. 23A, a higher layer 2301 may send the discovery information (or the discovery container) to a protocol stack using an application platform interface (API). The protocol stack may include D2D PDCP, RLC, MAC and PHY layers 2303, 2305, 2307 and 2309. The discovery information (or the discovery container) may be first processed by the PDCP layer 2303 to apply the security specific to the D2D system to the discovery information (or the discovery container). The RLC layer 2305 may operate in a transparent mode (TM), and perform no processing. The MAC layer 2307 may then add a MAC header (for pre-filtering, padding, logical channel ID, length indicator or length field in case of variable length MAC service data unit (SDU), etc.), and send the discovery PDU to the PHY layer 2309. The MAC layer 2307 may not add any header, and transparently send the discovery PDU to the PHY layer 2309.

Figure 23B:
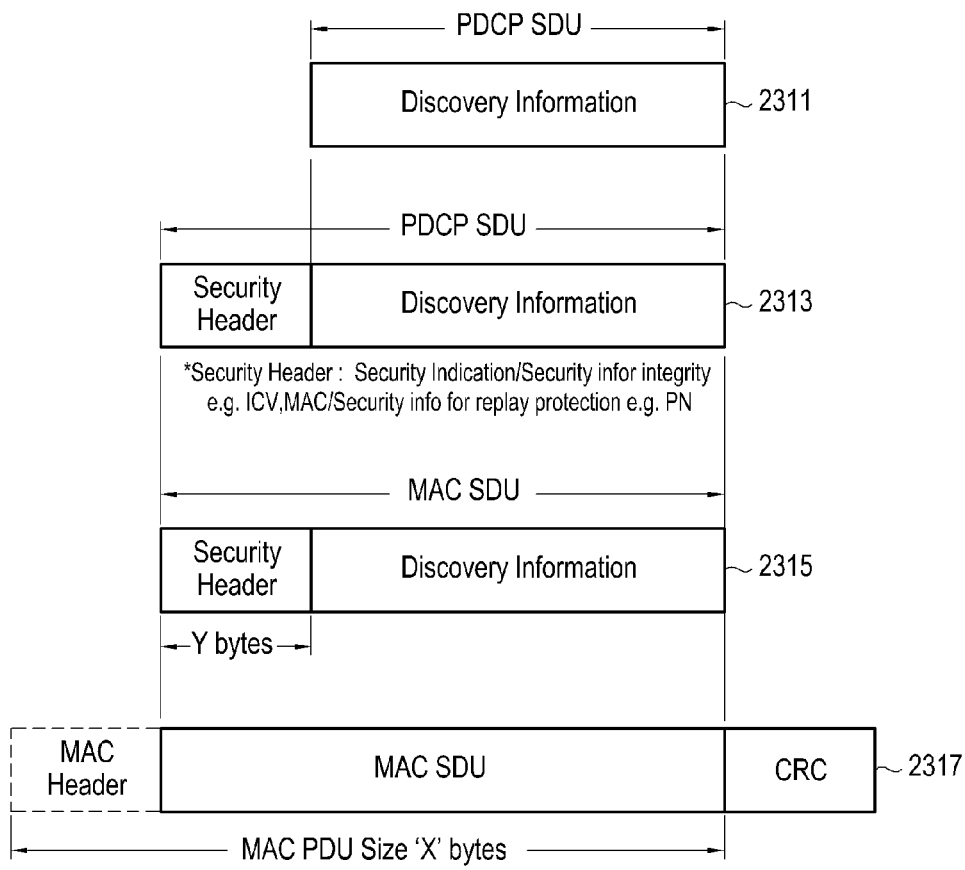
FIG. 23B to 23D illustrate methods of forming a discovery PDU according to various embodiments of the present disclosure.

FIG. 23B illustrates a method of forming a discovery PDU according to an embodiment of the present disclosure.

Referring to FIG. 23B, the protocol stack may determine the MAC SDU size based on the discovery channel. The MAC SDU size in FIG. 23B may be, for example, 'X' bytes. The protocol stack may then determine the size of discovery information/container that the application should provide and send it to the higher layer.

The discovery container size in FIG. 23B may be 'X-Y' bytes. The higher layer may send a discovery container carrying discovery information of the size indicated by the protocol stack, to the protocol stack. The PDCP layer may process the discovery information in operation 2311, and add the security header to the discovery container carrying discovery information in operation 2313. In operation 2315, the discovery container carrying the discovery information together with the security header is then processed by the MAC layer. The MAC layer may add MAC header and the CRC in operation 2317. The CRC may be added by the PHY layer in an embodiment.

Figure 23C:
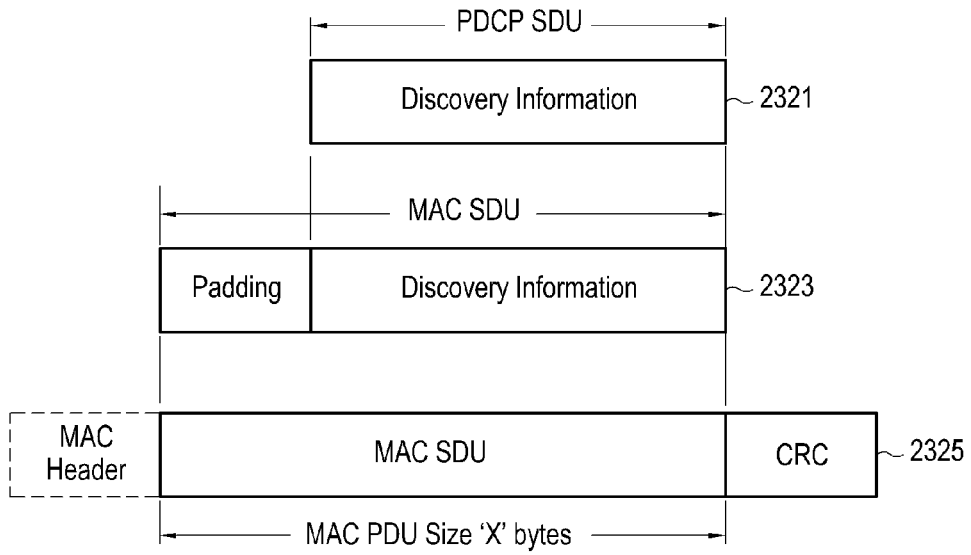

FIG. 23C illustrates a method of forming a discovery PDU according to an embodiment of the present disclosure.

It is to be noted that security is not necessary for each of discovery information. In case the discovery information which needs to be transmitted does not require any security, then the space left in absence of the security header may be utilized as follows:

Referring to FIG. 23C, padding may be performed by the protocol stack in place of the security header. In this case, the protocol stack may request the same size of discovery information from the application layer, irrespective of whether security is present or not. In operation 2321, the PDCP layer may process the discovery information. In operation 2323, the MAC layer may process the discovery container carrying the discovery information. A specific pattern can be used for padding so that a receiver can know if padding is present or a security header is present. In operation 2325, some bits in the MAC header may also indicate the same (i.e., indicate whether padding is present or a security header is present), if the MAC header is added by the MAC layer.

Figure 23D:
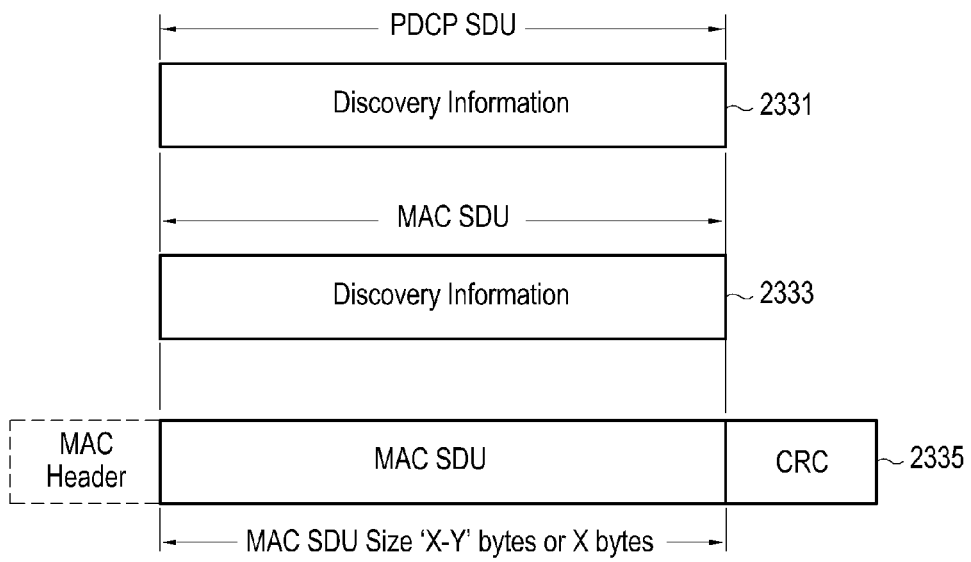

FIG. 23D illustrates a method of forming a discovery PDU according to an embodiment of the present disclosure.

Referring to FIG. 23D, in operation 2331, the PDCP layer may process the discovery information. The protocol stack may request, from the higher layer, discovery information of size 'X' bytes instead of 'X-Y' bytes if the security is not needed. In operation 2333, the discovery container carrying the discovery information may be processed by the MAC layer. In operation 2335, the MAC layer may add a MAC header and a CRC. In this embodiment, a MAC SDU of size 'X'-Y' may be built, and transmitted using lesser physical channel resources. In this case, the protocol stack may request the same size of discovery information from the higher layer irrespective of whether security is present or not. This is illustrated in FIG. 23D.

Figure 24:
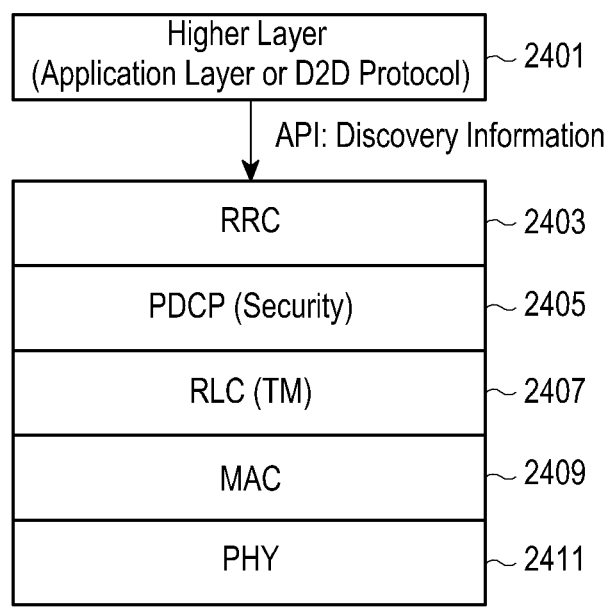
FIG. 24 illustrates protocol stack architecture for a discovery PDU according to an embodiment of the present disclosure.

FIG. 24 illustrates protocol stack architecture for a discovery PDU according to an embodiment of the present disclosure.

Referring to FIG. 24, an application layer 2401 may send the discovery information (or the discovery container) to a protocol stack using an API. The protocol stack may include D2D RRC, D2D PDCP, RLC, MAC and PHY layers 2403, 2405, 2407, 2409 and 2411. The discovery information (or the discovery container) may be first processed by the D2D RRC layer 2403 to build an RRC message carrying the discovery information. The RRC message may then be processed by the PDCP layer 2405 to apply the security specific to the D2D system to the RRC message carrying the discovery information (or the discovery container). The RLC layer 2407 may operate in a transparent mode (TM), and perform no processing. The MAC layer 2409 may then add a MAC header (for pre-filtering, padding, etc.) and send the discovery PDU to the PHY layer 2411. The MAC layer 2409 may not add any header and transparently send the discovery PDU to the PHY layer 2411.

The forming of a discovery PDU in this embodiment may be the same as that in FIG. 23 except that a PDCP SDU is an RRC message carrying discovery information instead of the discovery container carrying discovery information from an application layer. In an embodiment, discovery information may be carried in a non-access stratum (NAS) message instead of an RRC message.

Security in Higher Layer

Figure 25A:
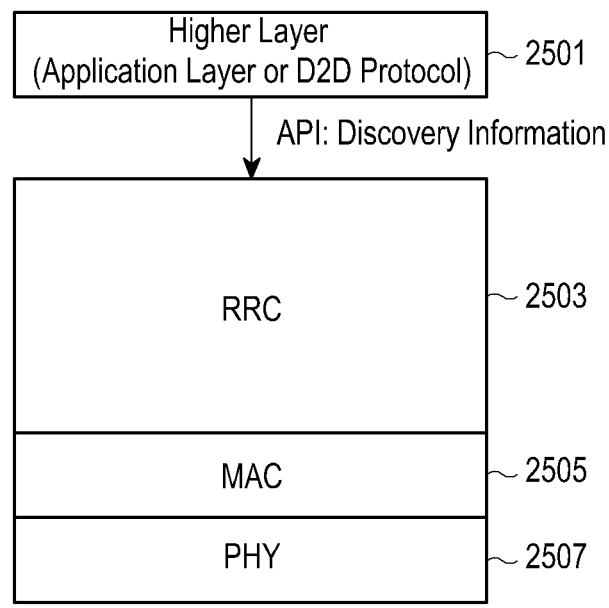
FIG. 25A illustrates protocol stack architecture for a discovery PDU according to an embodiment of the present disclosure.

FIG. 25A illustrates protocol stack architecture for a discovery PDU according to an embodiment of the present disclosure.

Referring to FIG. 25A, a higher layer 2501 may send the discovery information (or the discovery container) to a protocol stack using an API. The protocol stack may include D2D RRC, MAC and PHY layers 2503, 2505, 2507.

Figure 25B:
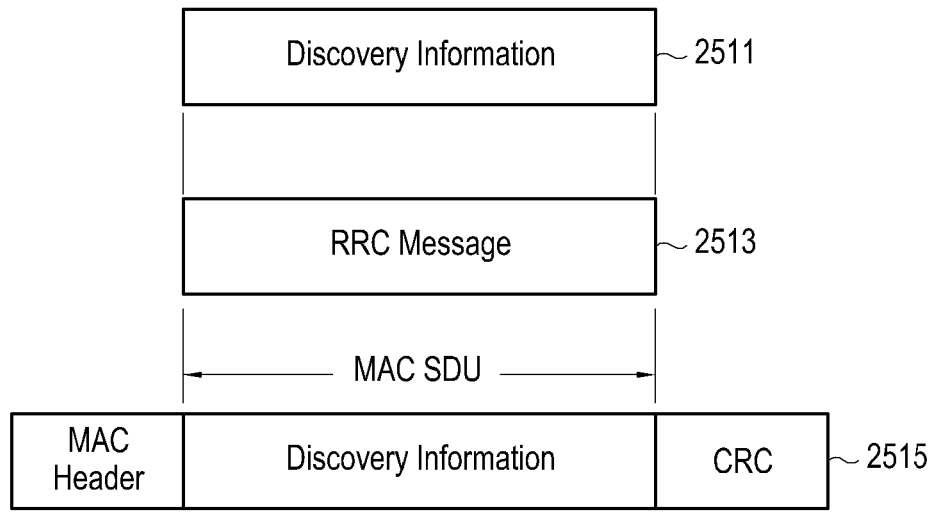
FIG. 25B illustrates a method of forming a discovery PDU according to an embodiment of the present disclosure.

FIG. 25B illustrates a method of forming a discovery PDU according to an embodiment of the present disclosure.

Referring to FIG. 25B, in operation 2511, the discovery information (or the discovery container) may be first processed by the D2D RRC layer 2503 to build a RRC message carrying discovery information. In operation 2513, the RRC message may then be processed by the MAC layer 2505, which adds a MAC header (for pre-filtering, padding etc.) and sends the discovery PDU to the PHY layer 2507. The MAC layer 2505 may not add any MAC header, and transparently send the discovery PDU to the PHY layer 2507. In operation 2515, the MAC layer 2505 may add a MAC header and a CRC. In an embodiment, the CRC may be added by the PHY layer 2507.

Figure 26A:
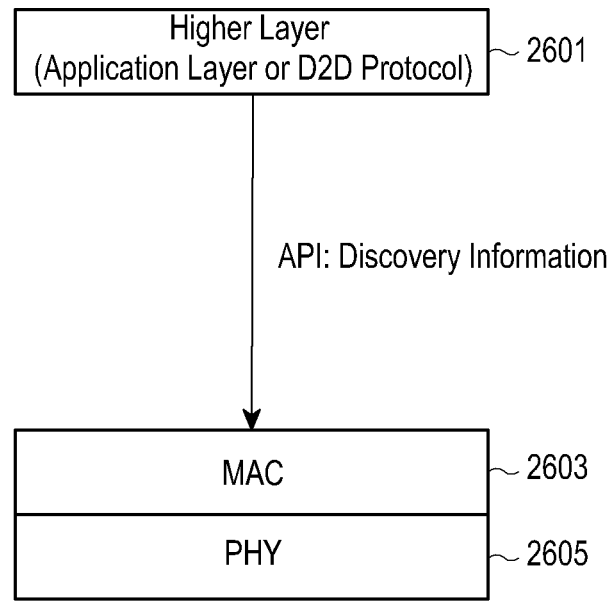
FIG. 26A illustrates protocol stack architecture for a discovery PDU according to an embodiment of the present disclosure.

FIG. 26A illustrates protocol stack architecture for a discovery PDU according to an embodiment of the present disclosure.

Referring to FIG. 26A, a higher layer 2601 may send the discovery information (or the discovery container) to a protocol stack using an API. The protocol stack may include D2D MAC and PHY layers 2603 and 2605.

The MAC layer 2603 may perform the following functions:

1. Interfaces with the higher layer (e.g., a D2D protocol or an application layer) 2601: The MAC layer 2603 may receive the discovery information from the higher layer (e.g., the D2D Protocol or the application layer) 2601 using the API. The IP layer may not be used for transmitting the discovery information. The discovery information may be transparent to the MAC layer 2603.

2. Scheduling: The MAC layer 2603 may determine the radio resources to be used for transmitting the discovery information received from the higher layer 2601. If the dedicated resource (e.g., resource of Type 2 in the long term evolution (LTE) system) is not configured by the RRC layer, then the MAC layer 2603 may select the resource of contention-based Type 1 (in, for example, the LTE system) for transmission from the transmission resource pool configured by the RRC layer. If the dedicated resource is configured by the RRC layer, then the MAC layer 2603 may select the dedicated resource of Type 2 for transmission.

3. Discovery PDU generation: The MAC layer 2603 may build the MAC PDU carrying the discovery information, and send the MAC PDU to the physical layer 2605 for transmission in the determined radio resource of Type 1 or Type 2. In one method, no MAC header may be added. In another method, the MAC layer 2603 may add a MAC header (for pre-filtering, padding etc.). The MAC layer 2603 may send the MAC PDU and the selected discovery resource for transmission, to the PHY layer 2605.

4. Security: In an embodiment, security may be applied by the MAC layer 2603. Alternately, the security may be applied at the higher layer 2601. If the security is applied in the MAC layer 2603, then a security key for security may also be received from the higher layer 2601 along with the discovery information.

5. Discovery Information Reception:
Receives indication from the higher layer 2601 for reception.
Determines the radio resources to be used for discovery information reception. Reception resource pool is configured by the RRC layer.
Sends the determined radio resource for discovery information reception to the PHY layer 2605.
Receives the MAC PDU carrying discovery information from the PHY layer 2605, and forwards the received discovery information to the higher layer 2601.

6. Priority handling between transmission of discovery information and reception of discovery information: If the higher layer 2601 indicates the MAC layer 2603 to transmit discovery information and also to receive discovery information, then the MAC layer 2603 may first determine the resources for transmission and then, the reception may be performed in discovery resources in other discovery time slots except the discovery time slot in which discovery information is transmitted.

7. Priority handling between wide area network (WAN) transmission (e.g., transmission from UE to BS) and transmission/reception of discovery information in by UE an upload (UL) time slot: WAN transmission is always prioritized in one method.

8. Priority handling between WAN reception (e.g., reception from BS by UE) in a download (DL) time slot and reception of discovery information by UE in a UL time slot: WAN reception is always prioritized. This prioritization may be applicable only for frequency division duplexing (FDD) system.

Figure 26B:
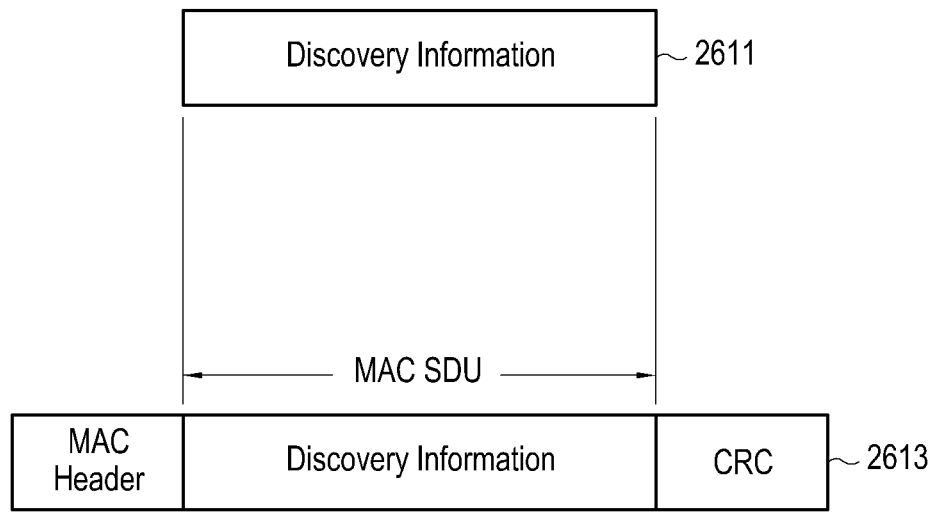
FIG. 26B illustrates a method of forming a discovery PDU according to an embodiment of the present disclosure.

FIG. 26B illustrates a method of forming a discovery PDU according to an embodiment of the present disclosure.

Referring to FIG. 26B, in operation 2611, transmission resources for discovery information may be determined as described in FIG. 26A, and the MAC layer 2603 may add a MAC header and a CRC in operation 2613.

Figure 27:
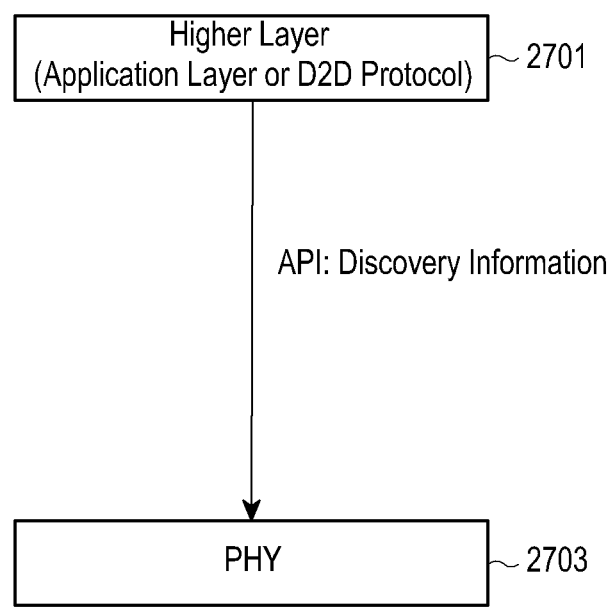
FIG. 27 illustrates protocol stack architecture for a discovery PDU according to an embodiment of the present disclosure.

FIG. 27 illustrates protocol stack architecture for a discovery PDU according to an embodiment of the present disclosure.

Referring to FIG. 27, a higher layer 2701 may send the discovery information (or the discovery container) to a PHY layer 2703 directly using an API. A D2D protocol of the higher layer 2701 may be implemented in a NAS layer.

Radio Bearer/Logical Channel and Transport Channel Structure for Discovery

In an embodiment of the present disclosure, there are three types of radio bearers that can be established for D2D communication.

1) Radio bearer Type 1: This type of radio bearer may carry signaling between one D2D device and another D2D device. For one D2D device, multiple radio bearers of this type can be created to support a D2D device to communicate with multiple D2D devices.

2) Radio bearer Type 2: This type of radio bearer may carry application data (excluding data related to discovery) between one D2D device and another D2D device during D2D communication. For one D2D device, multiple radio bearers of this type can be created to support a D2D device to communicate with multiple D2D devices.

3) Radio bearer Type 3: This type of radio bearer may carry discovery information transmitted by the D2D device. Multiple radio bearers of this type can be established in a D2D device as illustrated in FIG. 28A.

Figure 28A:
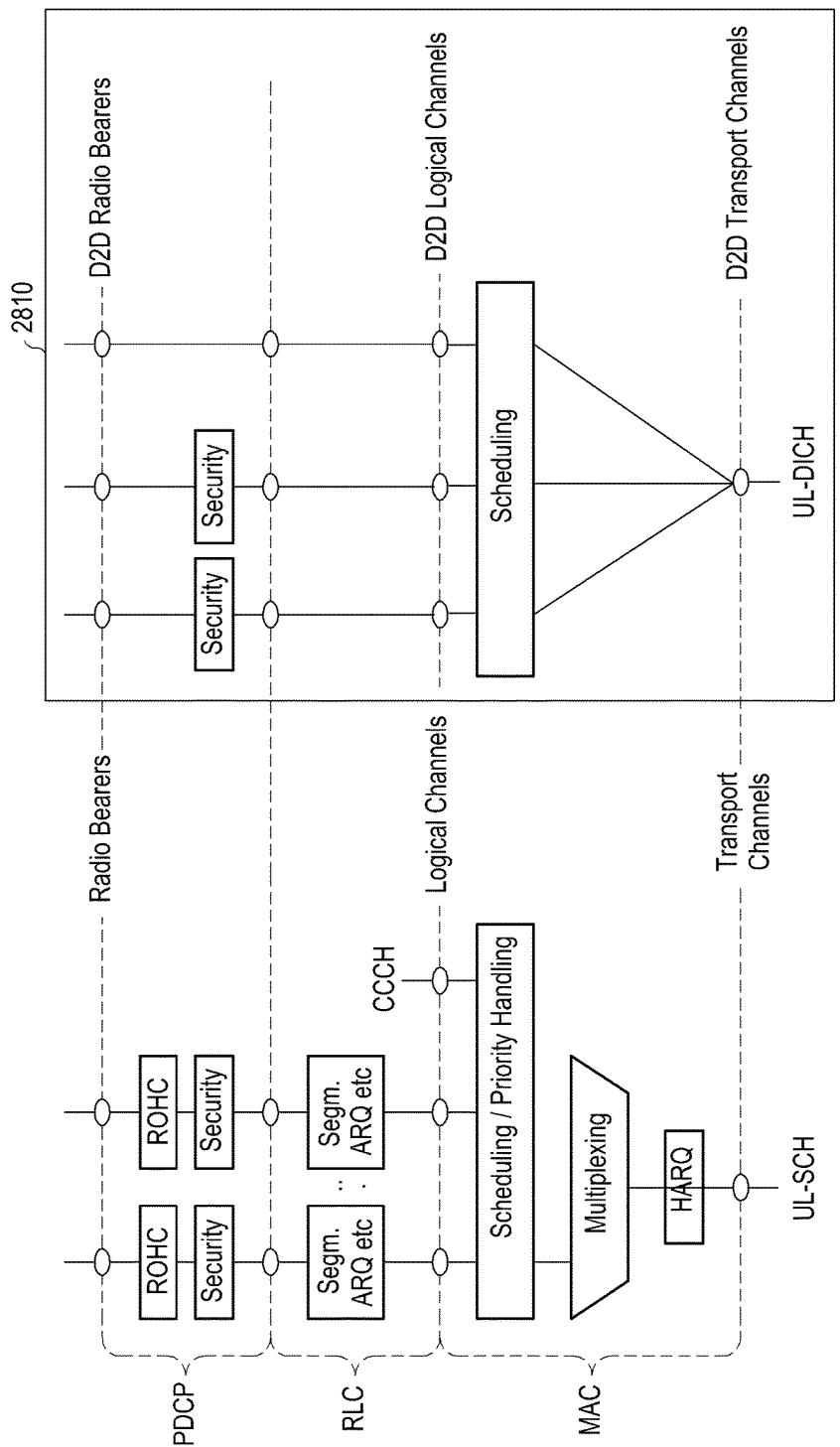
FIGS. 28A and 28B illustrate structures of radio bearers/logical channels and transport channels for carrying discovery information according to various embodiments of the present disclosure.
Figure 28B:
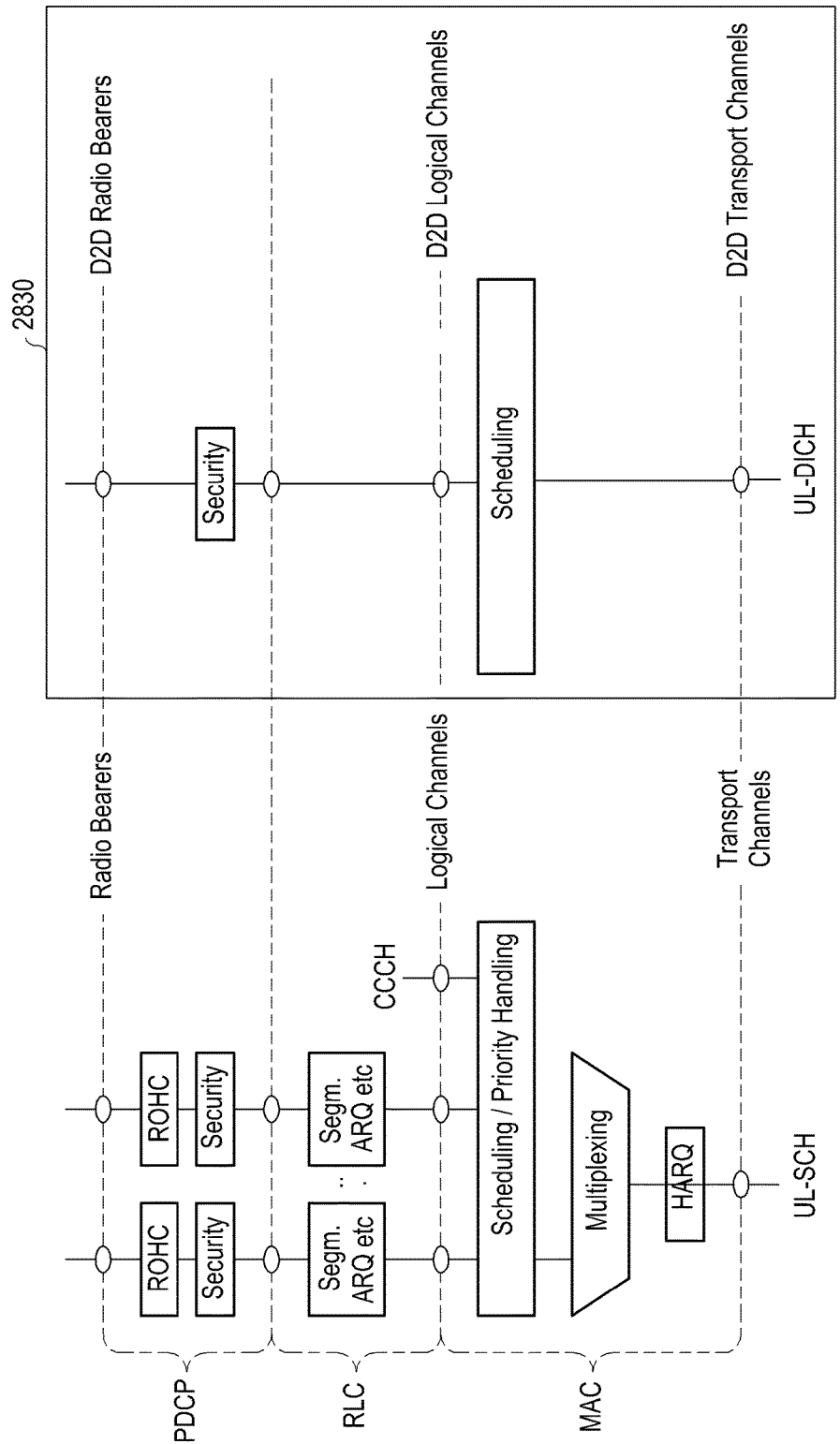

FIGS. 28A and 28B illustrate structures of radio bearers/logical channels and transport channels for carrying discovery information according to various embodiments of the present disclosure.

Referring to FIG. 28A, as shown by reference numeral 2810, discovery information, for which security is applied, and discovery information, for which security is not applied, may be carried in different radio bearers. The first radio bearer can be used for carrying discovery information for which security is not applied by the protocol stack. PDCP/RLC functions may not be applied to this D2D radio bearer. The second radio bearer can be used for carrying discovery information for which security is applied by the protocol stack. The PDCP function will be applied to these radio bearers. The mapping of the radio bearer to the discovery information may be performed based on the discovery category. The MAC layer may perform the scheduling for logical channels for these radio bearers on the discovery transport channel. In an embodiment, there may be only one radio bearer of this type for carrying the discovery information for which security is applied, as shown by reference numeral 2830 in FIG. 28B.

Pre-Filtering Control Flow

Figure 29A:
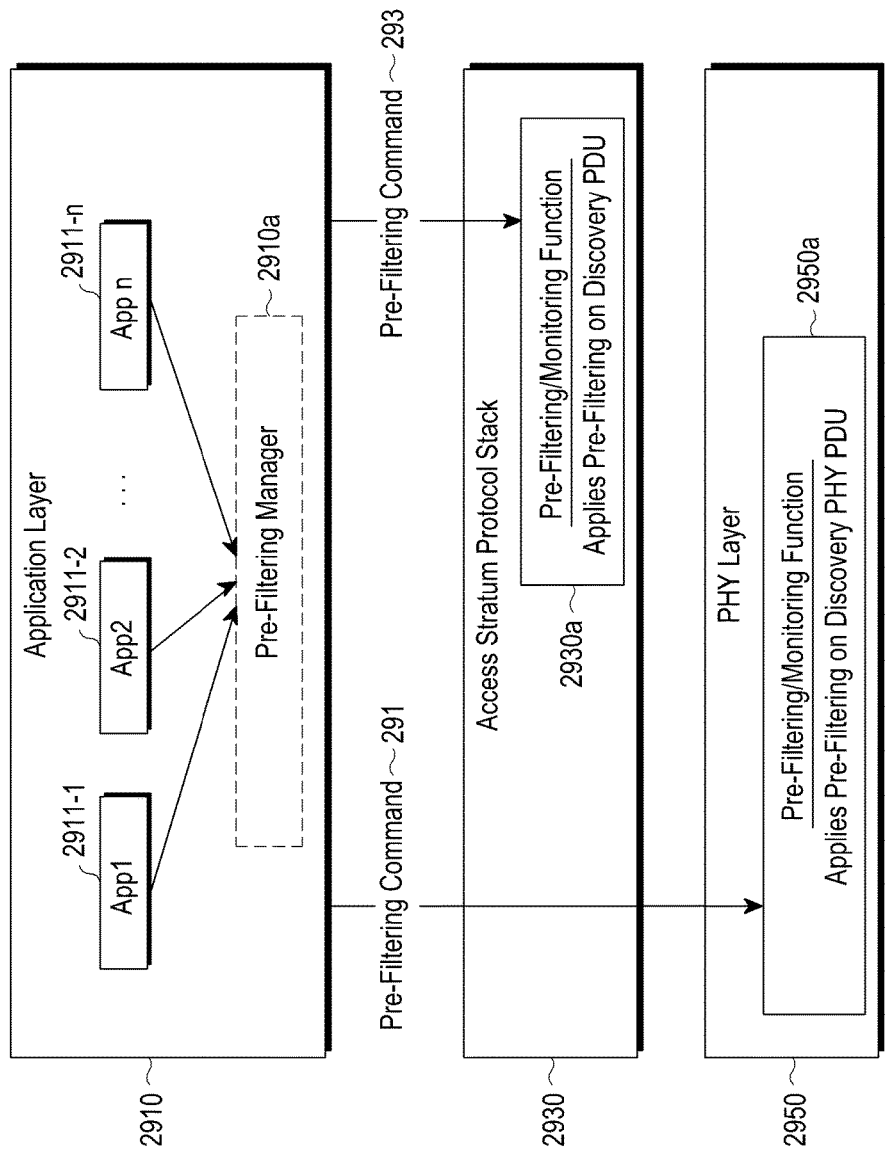
FIGS. 29A and 29B illustrate a control flow for pre-filtering according to various embodiments of the present disclosure.
Figure 29B:
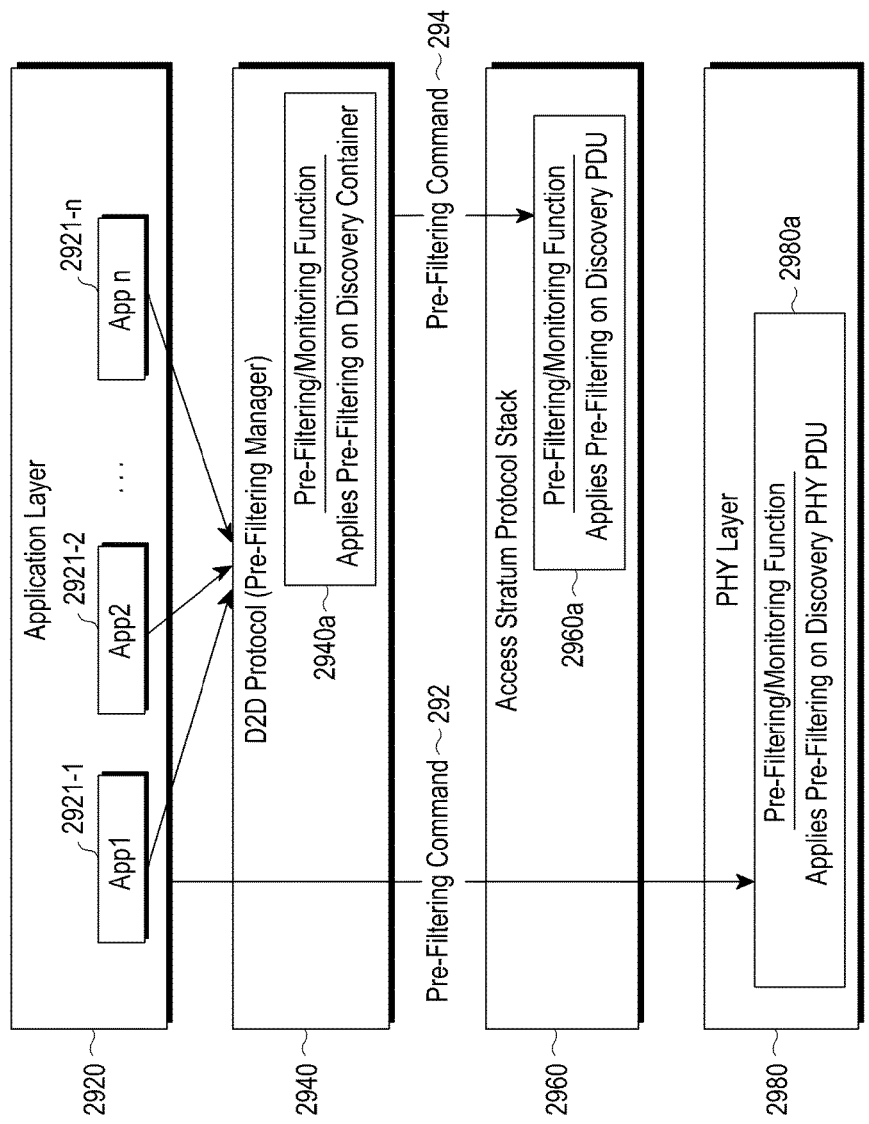

FIGS. 29A and 29B illustrate a control flow for pre-filtering according to various embodiments of the present disclosure.

Referring to FIGS. 29A and 29B, the pre-filtering/monitoring functions 2930a, 2940a, 2950a, 2960a and 2980a may be located in AS protocol stacks 2930 and 2960, a D2D protocol 2940, and/or PHY layers 2950 and 2980. The pre-filtering parameter(s) may be sent by higher layers 2910 and 2920 (for example, via a pre-filtering manager 2910a) to pre-filtering/monitoring functions 2930a, 2940a, 2950a and 2980a in the form of pre-filtering command 291, 292, 293 and 294. The higher layers 2910 and 2920 including applications 2911-1~2911n, 2921-1~2921-n may be an application layer or a D2D protocol.

Figure 30A:
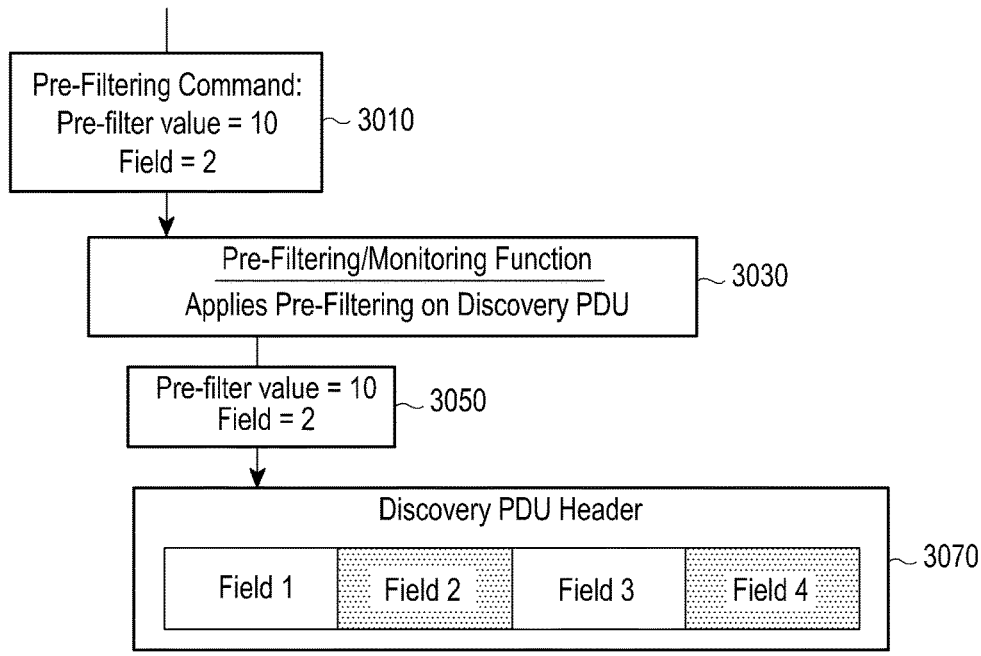
FIGS. 30A and 30B illustrate a pre-filtering command according to various embodiments of the present disclosure.
Figure 30B:
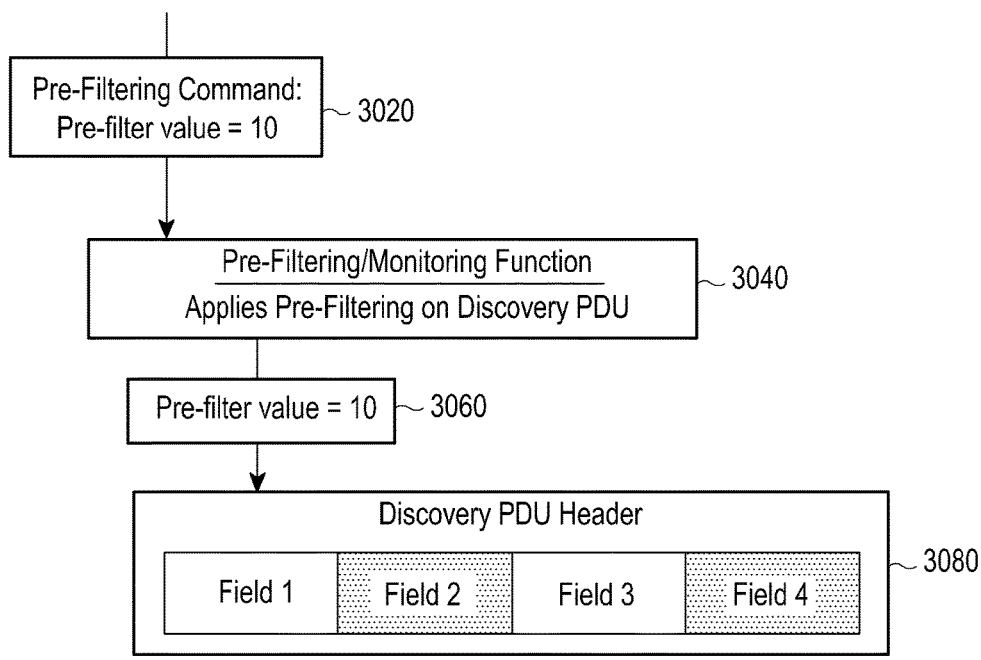

FIGS. 30A and 30B illustrate a pre-filtering command according to various embodiments of the present disclosure.

Referring to FIGS. 30A and 30B, first, the discovery PDU structure may include a header and a discovery container. In this case, a certain field of specified size and at a specific location may be reserved for carrying the pre-filtering parameter. This field is like a place holder for a higher layer (e.g., an application layer or a D2D protocol) to encode some information at transmitting UEs which can then be used to pre-filter at the monitoring UE. The pre-filtering parameter (e.g., an application ID, a discovery type or anything else) may be decided at the higher layer. In the monitoring UE, the higher layer may send a pre-filtering command 3010 to a pre-filtering/monitoring function 3030, and the pre-filtering command 3010 may include a pre-filter value 'x' and the field 'y' 3050 in a header 3070 of the discovery PDU. This means that a discovery container may be sent to the higher layer or is of interest to the monitoring UE if the field 'y' in the header 3070 of the discovery PDU carries value 'x'. For example, as illustrated in FIG. 30A, two fields Field_2 and Field_4 may present in the header 3070 of the discovery PDU for pre-filtering. In the example of FIG. 30A, the higher layer may send a pre-filtering command to a pre-filter value 10 from Field_2 in the header.

In an embodiment, if only field is reserved for pre-filtering in the header as illustrated in FIG. 30B, the field 'y' indication may not be required in a pre-filtering command 3020. Only one field may be present in a header 3080 of the discovery PDU for pre-filtering. The higher layer may send a pre-filtering command 3020 to a pre-filtering/monitoring function 3040, and send the pre-filtering command 3020 to a pre-filtering/monitoring value=10 3060. In this case, there is no need to indicate which field is a field for pre-filtering.

The pre-filtering may be performed using a CRC. In this case, the pre-filtering command indicates a pre-filter value 'x' in a CRC mask. The pre-filtering command may be send to the Pre-filtering/monitoring function in the PHY layer. The PHY layer may generate the CRC mask corresponding to this value, and check the CRC in the received discovery PHY PDU. The PHY layer may not need to know about what that pre-filter value means at the higher layer.

Pre-Filtering Using Pre-Filtering Mask

The pre-filtering in the monitoring UE can be performed using the discovery information received in the discovery container. In this case, the higher layer may send the pre-filtering command with information about the part of discovery information which needs to be used to pre-filter and the value that should be used for pre-filtering, to a pre-filtering/monitoring function. In an embodiment, a pre-filtering command can convey this information in the form of a pre-filter mask and a pre-filter value. Alternately, the pre-filtering command may provide the byte/bit offset and the number of bytes/bits from the byte/bit offset that should be used for pre-filtering. In an embodiment, a pre-filtering command may carry multiple such pre-filtering masks and pre-filtering values. The pre-filtering using the pre-filtering mask and the pre-filtering value may be performed in a D2D protocol, an AS protocol stack, or a PHY layer.

In one method, the discovery information may include the D2D application code corresponding to the D2D application ID. The D2D application ID may have a hierarchical structure. For example, the D2D application ID may include a broad-level service category followed by the service sub-category/service name, etc. The D2D application code may be a temporary identifier for the D2D application ID, and may be assigned to the transmitting UE by the D2D server/D2D function in the home network (i.e., home public land mobile network (PLMN)). The D2D application ID may also have or contain information about the network (i.e., PLMN) which has assigned this D2D application ID. As the D2D application ID has a hierarchical structure (many parts), the D2D application code may be generated by assigning a code to each part of the D2D application ID. The transmitting UE may transmit the D2D application code corresponding to the D2D application ID.

During the monitoring of discovery physical channel(s), the monitoring UE will receive several discovery information transmitted by several UEs, and will perform pre-filtering to find the discovery information it is interested in.

Figure 31:
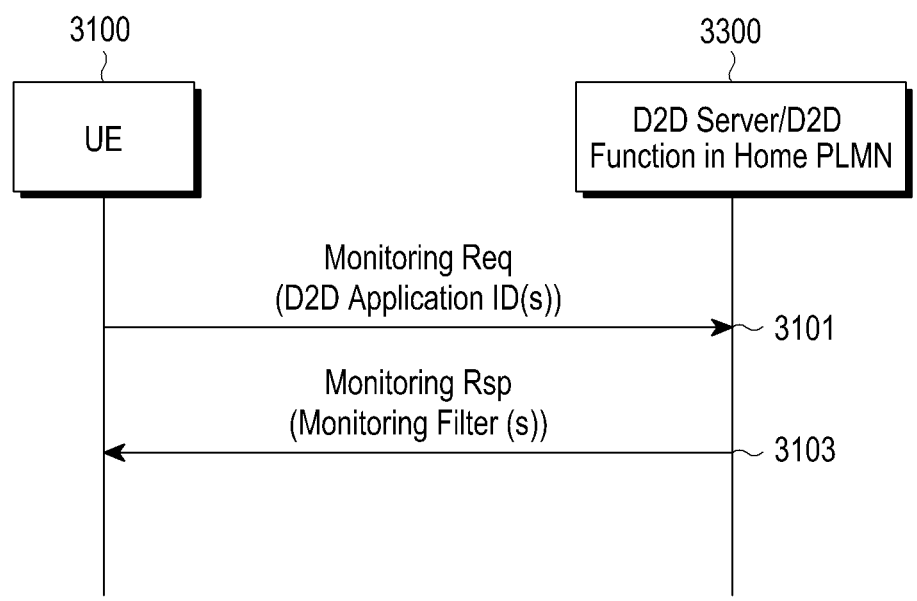
FIG. 31 illustrates a method of obtaining a monitoring filter for pre-filtering by a monitoring UE according to an embodiment of the present disclosure.

FIG. 31 illustrates a method of obtaining a monitoring filter for pre-filtering by a monitoring UE according to an embodiment of the present disclosure.

Referring to FIG. 31, a monitoring UE 3100 may be pre-configured with a D2D application ID(s) that the monitoring UE 3100 is authorized to monitor. If the monitoring UE is interested to monitor a certain D2D application ID(s), the monitoring UE may establish a connection with a D2D server (also referred to as a D2D function) 3300 in the home PLMN. The D2D application ID sent may be a full D2D application ID name or a partial D2D application ID name. In operation 3101 in FIG. 31, the monitoring UE 3100 may send a Monitoring Request message with the D2D application ID(s) to the D2D server/D2D function 3300 in the home PLMN.

In operation 3103, the D2D server/D2D function 330 in the home PLMN may send a monitoring response message carrying the monitoring filter(s) to the monitoring UE 3100. The monitoring filter(s) may include one or more pre-filter masks and pre-filter values. The pre-filter masks and pre-filter values indicate the portion of discovery information. The pre-filter mask and the pre-filter value may, for example, be the D2D application code which needs to be used to pre-filter, and the pre-filter value that should be used for pre-filtering. The monitoring response message may also include the information about the time duration for which the monitoring filter(s) are valid. If the D2D application ID that the D2D server/D2D function 330 has received from the monitoring UE 3100 belongs to another PLMN, the D2D server/D2D function 3300 may contact that PLMN to get the monitoring filter(s).

During the discovery monitoring, the monitoring UE 3100 may filter all the received D2D application codes in the discovery container using the monitoring filter(s) received from the D2D server/D2D function 3300 in the home PLMN (HPLMN). If the UE finds D2D application code(s) that matches the monitoring filter(s), then the UE may determine the D2D application ID(s) corresponding to the D2D application code(s) using the locally stored mapping information, or may ask the D2D server/D2D function in the HPLMN.

Information Added by Protocol Stack

In an embodiment of the present disclosure, information (hereinafter, referred to as 'header information') can be added in the form of a header to the discovery information received from the application layer. The header information may include, for example, at least one of information fields such as discovery category, security indication, security information, ProSe UE ID, attributes, and application ID. At least one of the information fields included in the header information may be added as follows.

FIGS. 32A and 32B illustrate a configuration of header information added to discovery information according to various embodiments of the present disclosure. FIG. 32A illustrates a configuration of the header information for which security is applied, and FIG. 32B illustrates a configuration of the header information for which security is not applied.

Referring to FIG. 32A, the header information may include discovery category 3201, security indication 3203, ProSe UE ID 3205, and security information 3207. The security information 3207 may be added in the header information, if the security indication 3203 is set to, for example, '1' (e.g., if security is applied).

Referring to FIG. 32B, in the case where the security is not applied (e.g., if security indication 3213 is set to '0'), the header information may include discovery category 3211, security indication 3213, and ProSe UE ID 3215. The padding or additional attributes (e.g., interest ID or information) or additional discovery information may be included, if the size of a discovery channel is fixed. If the size of a discovery channel is variable or if multiple capacity discovery channels are present, then the padding or additional attributes (e.g., interest ID or information) or additional discovery information may not be needed. In various embodiments, an application ID may be present in place of the discovery category. In various embodiments, both the application ID and the discovery category may be present. In various embodiments in which the security is specific to discovery category, the security indication 3203 and 3213 may not be needed, as the presence and absence of the security is known using the discovery category. In various embodiments, the discovery category may not be present in the header information, and may be indicated using the discovery resource category.

Figure 33A:
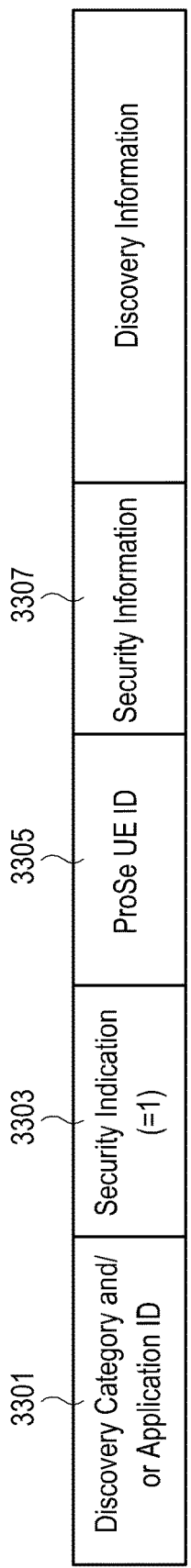
FIGS. 33A and 33B illustrate a configuration of header information added to discovery information according to various embodiments of the present disclosure.
Figure 33B:
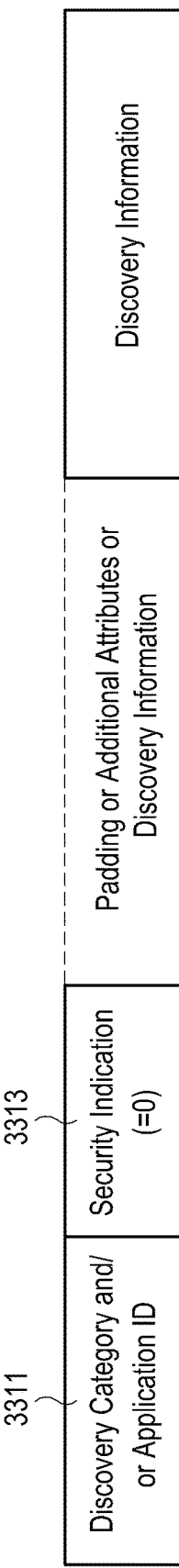

FIGS. 33A and 33B illustrate a configuration of header information added to discovery information according to various embodiments of the present disclosure. FIG. 33A illustrates a configuration of the header information for which security is applied, and FIG. 33B illustrates a configuration of the header information for which security is not applied.

Referring to FIG. 33A, the header information may include discovery category 3301, security indication 3303, ProSe UE ID 3305, and security information 3307. The security information 3307 and the ProSe UE ID 3305 may be added in the header information, if the security indication 3303 is set to, for example '1' (e.g., if security is applied).

Referring to FIG. 33B, in the case where the security is not applied (e.g., security indication 3313 is set to '0'), the header information may include discovery category 3311 and security indication 3313. The padding or additional attributes (e.g., interest ID or information) or additional discovery information can be included, if the size of a discovery channel is fixed. If the size of a discovery channel is variable or if multiple capacity discovery channels are present, then the padding or additional attributes (e.g., interest ID or information) or additional discovery information may not be needed. In various embodiments, an application ID may be present in place of the discovery category. In various embodiments, both the application ID and the discovery category may be present. In various embodiments in which the security is specific to discovery category, security indication 3303 and 3313 may not be needed, as the presence and absence of the security is known using the discovery category. In various embodiments, the discovery category may not be present in the header information, and may be indicated using the discovery resource category.

FIGS. 34A and 34B illustrate a configuration of header information added to discovery information according to various embodiments of the present disclosure. FIG. 34A illustrates a configuration of the header information for which security is applied, and FIG. 34B illustrates a configuration of the header information for which security is not applied.

Referring to FIG. 34A, the header information may include discovery category 3401, security indication 3404, and security information 3405. The security information 3405 may be added in the header information, if the security indication 3404 is set to, for example, '1' (e.g., if security is applied).

Referring to FIG. 34B, in the case where the security is not applied (e.g., security indication 3413 is set to '0'), the header information may include discovery category 3411 and security indication 3413. The padding or additional attributes (e.g., interest ID or information) or additional discovery information can be included if the size of a discovery channel is fixed. If the size of a discovery channel is variable or if multiple capacity discovery channels are present, then the padding or additional attributes (e.g., interest ID or information) or additional discovery information may not be needed. In various embodiments, an application ID may be present in place of the discovery category. In various embodiments, both the application ID and the discovery category may be present. In various embodiments in which the security is specific to discovery category, security indication 3403 and 3413 may not be needed, as the presence and absence of the security is known using the discovery category. In various embodiments, the discovery category may not be present in the header information, and may be indicated using the discovery resource category.

Discovery Category

In an embodiment of the present disclosure, the discovery categorization may be performed in at least one of the following ways. It is to be noted that these categorization is for illustration only and does not limit the scope of usage of the disclosure for other discovery categorization.

Categorization Method 1:
    Unicast Discovery: Finding friend(s), Paging, etc.
    Group Discovery: Finding specific group or group members like public safety.

The unicast discovery and the group discovery may be restricted to specific UE(s)
  Broadcast Discovery: Advertisements, Relay Discovery for network (NW) connectivity, Relay Discovery for UE connectivity, Finding specific interest services or people, etc.
The broadcast discovery may not be restricted to specific UEs.
  Categorization Method 2:
    Unicast Discovery: Announcing type, Soliciting type, etc.
    Group Discovery: Announcing type, Soliciting type, etc.
    Broadcast Discovery
  Categorization Method 3:
    Unicast Discovery: Finding friend(s), Paging, etc.
    Group Discovery: Finding specific group or group members like public safety, etc.
The unicast discovery and group discovery may be restricted to specific UE(s).
  Broadcast Discovery: Advertisements, Finding specific interest services or people, etc.
The broadcast discovery may not be restricted to specific UEs
  Relay Discovery: Relay discovery for NW connectivity, Relay Discovery for UE connectivity, etc.
  Categorization Method 4:
    Unicast Discovery: Announcing type, Soliciting type, Reply, Confirming, etc.
    Group Discovery: Announcing type, Soliciting type, Reply, Confirming, etc.
    Broadcast Discovery: Advertisements, Finding specific interest services or people, etc.
The broadcast discovery may not be restricted to specific UEs.
  Relay Discovery: Relay discovery for NW connectivity (Announcing type, Soliciting type), Relay Discovery for UE connectivity (Announcing type, Soliciting type), etc.
  Categorization Method 5:
    Open Discovery, Restricted Discovery
  Categorization Method 6:
    Announcing, Soliciting, Relaying, Confirming
  Categorization Method 7:
    Public safety discovery, non-public safety discovery The foregoing embodiments of the present disclosure may be implemented as a computer-readable code in a computer-readable recording medium. The computer-readable recording medium may be any data storage device capable of storing the data that can be read by the computer system. Examples of the computer-readable recording medium may include read-only memories (ROMs), volatile or non-volatile memories, compact disc ROMs (CD-ROMs), magnetic tapes, floppy disks, optical data storage devices, and carrier waves (e.g., data transmission over the Internet). In addition, the functional programs, codes, and code segments for achieving the embodiments of the present disclosure may be easily interpreted by the programmers skilled in the field of the disclosure.

It can be appreciated that the apparatus and method according to embodiments of the present disclosure may be implemented in the form of hardware, software, or a combination thereof. The software may be stored in a volatile or non-volatile storage device (e.g., an erasable/re-writable ROM), a memory (e.g., a random access memory (RAM), a memory chip, or a memory integrated circuit (IC)), or an optically/magnetically recordable machine (e.g., computer)-readable storage medium (e.g., CD, CD-ROM, magnetic disk, or magnetic tape). The method according to embodiments of the present disclosure may be implemented by a computer or various mobile terminals including a controller and a memory, or by a network entity such as a server managed by the communication operator in the mobile communication system. The memory may be an example of the machine-readable storage medium suitable to store a program or programs including instructions for implementing embodiments of the present disclosure.

Therefore, embodiments of the present disclosure may include a program including the code for implementing the apparatus and method as defined by the appended claims, and a non-transitory machine (e.g., computer)-readable storage medium storing the program.

As is apparent from the foregoing description, according to an embodiment of the present disclosure, various methods may be provided, in which a UE may pre-filter its interested discovery information using CRC, application ID, resource category, discovery preamble and the like in the D2D communication system.

Further, according to an embodiment of the present disclosure, the discovery information may be easily transmitted and received by sending the discovery information directly from a higher layer such as an application layer to a physical layer in the D2D communication system.

In addition, according to an embodiment of the present disclosure, a MAC layer may easily schedule resources for transmission of the discovery information in the D2D communication system.

Although embodiments of the present disclosure have been described separately in this specification, two or more of these embodiments may be implemented in combination.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. A method for transmitting discovery information by a user equipment (UE) in a wireless communication system supporting a proximity service, the method comprising:
    receiving directly from a proximity service (ProSe) protocol layer of the UE, in a medium access control (MAC) layer of the UE, discovery information for discovery associated with the proximity service;
    generating, in the MAC layer, a MAC protocol data unit (PDU) including the received discovery information;
    transmitting, in a physical (PHY) layer, a discovery signal including the generated MAC PDU, and
    transmitting or receiving between the UE and a base station,
    wherein transmission or reception between the UE and the base station is higher in priority than transmission of the discovery signal.

2. The method of claim 1, further comprising determining a resource to be used for transmission of the discovery information in the MAC layer.

3. The method of claim 1, wherein a protocol stack, included in the UE, for the discovery includes the MAC layer and the PHY layer.

4. The method of claim 1, wherein an internet protocol layer is not used for transmission of the discovery information.

5. The method of claim 1, wherein no MAC header is added to the MAC PDU.

6. The method of claim 1, wherein the discovery signal is transmitted using a specific subframe.

7. A user equipment (UE) for transmitting discovery information in a wireless communication system supporting a proximity service, the UE comprising:
   a transmitter configured to transmit a signal; and
   a controller configured to control to:
      receive directly from a proximity service (ProSe) protocol layer of the UE, in a medium access control (MAC) layer of the UE, discovery information for discovery associated with the proximity service,
      generate, in the MAC layer, a MAC protocol data unit (PDU) including the received discovery information,
      transmit, in a physical (PHY) layer, a discovery signal including the generated MAC PDU, and
      transmit or receive between the UE and a base station,
   wherein transmission or reception between the UE and the base station is higher in priority than transmission of the discovery signal.

8. The UE of claim 7, wherein the controller is further configured to determine a resource to be used for transmission of the discovery information in the MAC layer.

9. The UE of claim 7, wherein the protocol stack for the discovery includes the MAC layer and the PHY layer.

10. The UE of claim 7, wherein the controller is further configured not to use an internet protocol layer for transmission of the discovery information.

11. The UE of claim 7, wherein no MAC header is added to the MAC PDU.

12. The UE of claim 7, wherein the controller is further configured to control to transmit the discovery signal using a specific subframe.

13. A method for receiving discovery information by a user equipment (UE) in a wireless communication system supporting a proximity service, the method comprising:
   receiving, in a physical (PHY) layer, a discovery signal including a medium access control protocol data unit (MAC PDU), the discovery signal including discovery information for discovery associated with the proximity service;
   extracting, from a MAC layer, the discovery information included in the received MAC PDU;
   forwarding directly to a proximity service (ProSe) protocol layer of the UE, in the MAC layer of the UE, the extracted discovery information; and
   transmitting or receiving between the UE and a base station,
   wherein transmission or reception between the UE and the base station is higher in priority than transmission of the discovery signal.

14. The method of claim 13, further comprising determining a resource to be used for reception of the discovery information in the MAC layer.

15. The method of claim 13, wherein a protocol stack, included in the UE, for the discovery includes the MAC layer and the PHY layer.

16. A user equipment (UE) for receiving discovery information in a wireless communication system supporting a proximity service, the UE comprising:
   a receiver configured to receive a signal; and
   a controller configured to control to:
      receive, in a physical (PHY) layer, a discovery signal including a medium access control protocol data unit (MAC PDU), the discovery signal including discovery information for discovery associated with the proximity service,
      extract, from a MAC layer, the discovery information included the received MAC PDU,
      forward directly to a proximity service (ProSe) protocol layer of the UE, in the MAC layer of the UE, the extracted discovery information, and
      transmit or receive between the UE and a base station,
   wherein transmission or reception between the UE and the base station is higher in priority than transmission of the discovery signal.

17. The UE of claim 16, wherein the controller is further configured to determine a resource to be used for reception of the discovery information in the MAC layer.

18. The UE of claim 16, wherein a protocol stack, included in the UE, for the discovery includes the MAC layer and the PHY layer.

* * * * *